United States Patent
Xue et al.

(10) Patent No.: US 11,473,471 B2
(45) Date of Patent: Oct. 18, 2022

(54) EXHAUST GAS TREATMENT SYSTEM

(71) Applicant: BASF Corporation, Florham Park, NJ (US)

(72) Inventors: Wen-Mei Xue, Dayton, NJ (US); John K. Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/735,491

(22) PCT Filed: Jun. 10, 2016

(86) PCT No.: PCT/US2016/036980
§ 371 (c)(1),
(2) Date: Dec. 11, 2017

(87) PCT Pub. No.: WO2016/201295
PCT Pub. Date: Dec. 15, 2016

(65) Prior Publication Data
US 2018/0163597 A1   Jun. 14, 2018

Related U.S. Application Data

(60) Provisional application No. 62/174,856, filed on Jun. 12, 2015.

(51) Int. Cl.
| | | |
|---|---|---|
| *B01J 23/42* | (2006.01) | |
| *B01J 23/44* | (2006.01) | |
| *F01N 3/28* | (2006.01) | |
| *F01N 3/20* | (2006.01) | |
| *B01D 53/94* | (2006.01) | |
| *B01J 23/02* | (2006.01) | |
| *B01J 35/04* | (2006.01) | |
| *C01C 1/02* | (2006.01) | |
| *F01N 3/08* | (2006.01) | |

(52) U.S. Cl.
CPC ......... *F01N 3/2803* (2013.01); *B01D 53/945* (2013.01); *B01D 53/9418* (2013.01); *B01D 53/9422* (2013.01); *B01D 53/9472* (2013.01); *B01D 53/9477* (2013.01); *B01J 23/02* (2013.01); *B01J 23/42* (2013.01); *B01J 23/44* (2013.01); *B01J 35/04* (2013.01); *C01C 1/02* (2013.01); *F01N 3/0814* (2013.01); *F01N 3/0842* (2013.01); *F01N 3/2066* (2013.01); *F01N 3/2073* (2013.01); *B01D 2255/1021* (2013.01); *B01D 2255/1023* (2013.01); *B01D 2255/2042* (2013.01); *B01D 2255/9032* (2013.01); *B01D 2255/91* (2013.01); *B01D 2255/9155* (2013.01); *F01N 2240/25* (2013.01); *F01N 2510/0682* (2013.01); *F01N 2510/0684* (2013.01); *F01N 2570/14* (2013.01); *F01N 2610/02* (2013.01); *Y02T 10/12* (2013.01)

(58) Field of Classification Search
None
See application file for complete search history.

(56) References Cited

U.S. PATENT DOCUMENTS

| | | | | |
|---|---|---|---|---|
| 6,852,666 | B1 * | 2/2005 | Bouly ................ | B01D 53/9422 502/302 |
| 9,480,948 | B2 * | 11/2016 | Okajima ................. | F01N 3/206 |
| 2006/0168949 | A1 * | 8/2006 | Xu ...................... | B01D 53/9422 60/295 |
| 2008/0069741 | A1 * | 3/2008 | Koermer ............ | B01D 53/9418 422/171 |
| 2008/0085231 | A1 * | 4/2008 | Vitse .................. | B01D 53/9409 423/239.1 |
| 2009/0000277 | A1 * | 1/2009 | Yoshida ................ | F01N 3/0814 60/286 |
| 2009/0288402 | A1 * | 11/2009 | Voss ...................... | F01N 3/2066 60/299 |
| 2010/0043404 | A1 * | 2/2010 | Hebbale ................ | F02D 41/021 60/286 |
| 2010/0052452 | A1 * | 3/2010 | Yoshino ............... | H02K 1/2793 310/156.01 |
| 2010/0058744 | A1 * | 3/2010 | Zhou ..................... | F01N 3/021 60/297 |

(Continued)

FOREIGN PATENT DOCUMENTS

| | | |
|---|---|---|
| DE | 102013205197 | 10/2013 |
| EP | 2 824 296 | 7/2012 |

(Continued)

OTHER PUBLICATIONS

Fridell, Erik, et al. "NOx storage in Barium-Containing Catalysts". Journal of Catalysis, 183, 196-209 (1999). (Year: 1999).*

*Primary Examiner* — Sheng H Davis

(74) *Attorney, Agent, or Firm* — Finnegan, Henderson, Farabow, Garrett & Dunner LLP

(57) ABSTRACT

Described are exhaust gas treatment systems for treatment of a gasoline engine exhaust gas stream. The exhaust gas treatment systems comprise an ammonia generating catalyst and an ammonia selective catalytic reduction (SCR) catalyst downstream of the ammonia generating catalyst. The ammonia generating catalyst comprises a $NO_x$ storage component, a refractory metal oxide support, a platinum component, and a palladium component. The ammonia generating catalyst is substantially free of ceria. The platinum and palladium components are present in a platinum to palladium ratio of greater than about 1 to 1.

27 Claims, 15 Drawing Sheets

(56) References Cited

U.S. PATENT DOCUMENTS

| | | | |
|---|---|---|---|
| 2010/0058746 A1* | 3/2010 | Pfeifer | B01J 35/0006 60/297 |
| 2010/0107606 A1 | 5/2010 | Narayanaswamy et al. | |
| 2010/0221154 A1* | 9/2010 | Lee | B01D 53/945 422/177 |
| 2010/0239478 A1* | 9/2010 | Arnold | B01J 29/7615 423/213.2 |
| 2010/0267548 A1* | 10/2010 | Andersen | B01D 53/8628 502/20 |
| 2011/0033374 A1* | 2/2011 | Prest | C04B 35/18 423/700 |
| 2011/0173950 A1* | 7/2011 | Wan | B01D 53/9431 60/274 |
| 2011/0212831 A1* | 9/2011 | Goto | B01D 46/2474 502/100 |
| 2012/0110988 A1* | 5/2012 | Dotzel | B01J 23/30 60/299 |
| 2012/0201731 A1* | 8/2012 | Ballinger | B01J 37/0215 423/213.2 |
| 2012/0269719 A1* | 10/2012 | Moden | B01D 53/9418 423/709 |
| 2013/0004391 A1* | 1/2013 | Pfeifer | B01D 53/9468 423/213.2 |
| 2013/0047582 A1* | 2/2013 | Gonze | F01N 3/2013 60/274 |
| 2013/0081378 A1 | 4/2013 | Bisaiji et al. | |
| 2013/0202507 A1* | 8/2013 | Echoff | F01N 3/0814 423/213.5 |
| 2013/0259779 A1 | 10/2013 | Kim et al. | |
| 2013/0323164 A1* | 12/2013 | Feyen | B01J 29/67 423/704 |
| 2013/0336865 A1* | 12/2013 | Brisley | B01D 53/9422 423/213.5 |
| 2014/0140911 A1* | 5/2014 | Bergeal | B01D 53/945 423/213.5 |
| 2014/0144125 A1* | 5/2014 | Cavataio | F01N 3/101 60/274 |
| 2014/0161679 A1* | 6/2014 | Chiffey | F01N 13/009 422/170 |
| 2014/0166126 A1* | 6/2014 | Turner | F01N 3/2066 137/334 |
| 2014/0248200 A1 | 9/2014 | Wan et al. | |
| 2014/0260214 A1 | 9/2014 | Xue et al. | |
| 2014/0271429 A1* | 9/2014 | Kazi | B01J 23/44 423/213.5 |
| 2014/0301923 A1 | 10/2014 | Tang et al. | |
| 2014/0322122 A1 | 10/2014 | Blakeman et al. | |
| 2015/0037233 A1* | 2/2015 | Fedeyko | B01D 53/8628 423/239.1 |
| 2015/0075140 A1* | 3/2015 | Swallow | B01D 53/9418 60/274 |
| 2015/0139875 A1* | 5/2015 | Schuetze | B01J 35/0006 423/213.5 |
| 2015/0152768 A1 | 6/2015 | Arulraj et al. | |
| 2015/0165418 A1* | 6/2015 | Kearl | B01J 23/10 423/212 |
| 2015/0252708 A1* | 9/2015 | Brown | B01D 53/9445 423/212 |
| 2017/0225119 A1* | 8/2017 | Mahecha-Botero | F23J 15/025 |

FOREIGN PATENT DOCUMENTS

| | | | |
|---|---|---|---|
| KR | 2001073509 | * | 1/2000 |
| RU | 2732441 | | 9/2020 |
| WO | WO 2012/029051 A1 | | 3/2012 |

* cited by examiner

EXHAUST GAS TREATMENT SYSTEM

CROSS-REFERENCE TO RELATED APPLICATIONS

The present application is a U.S. National Stage of International Patent Application PCT/US2016/036980, filed Jun. 10, 2016 and claims priority to U.S. Provisional Patent Application No. 62/174,856, filed Jun. 12, 2015. The disclosures of each of the applications noted above are incorporated herein by reference in their entirety.

TECHNICAL FIELD OF THE INVENTION

The present invention relates generally to the field of gasoline engine exhaust after-treatment systems.

BACKGROUND OF THE INVENTION

Exhaust gas from vehicles powered by gasoline engines is typically treated with one or more three-way conversion (TWC) automotive catalysts, which are effective to abate nitrogen oxides ($NO_x$), carbon monoxide (CO), and hydrocarbon (HC) pollutants in the exhaust gas of engines operated at or near stoichiometric air/fuel conditions. The precise proportion of air to fuel which results in stoichiometric conditions varies with the relative proportions of carbon and hydrogen in the fuel. An air-to-fuel (A/F) ratio is stoichiometric when complete combustion of a hydrocarbon fuel, such as gasoline, to carbon dioxide ($CO_2$) and water occurs. The symbol $\lambda$ is used to represent the result of dividing a particular A/F ratio by the stoichiometric A/F ratio for a given fuel, so that $\lambda=1$ is a stoichiometric mixture, $\lambda>1$ is a fuel-lean mixture and $\lambda<1$ is a fuel-rich mixture.

Gasoline engines having electronic fuel injection systems provide a constantly varying air-fuel mixture that quickly and continually cycles between lean and rich exhaust. Recently, to improve fuel-economy, gasoline-fueled engine are being designed to operate under lean conditions. Lean conditions refers to maintaining the ratio of air to fuel in the combustion mixtures supplied to such engines above the stoichiometric ratio so that the resulting exhaust gases are "lean," i.e., the exhaust gases are relatively high in oxygen content. Lean burn gasoline direct injection (GDI) engines offer fuel efficiency benefits that can contribute to a reduction in greenhouse gas emissions, carrying out fuel combustion in excess air. A major by-product of lean combustion is $NO_x$, the after-treatment of which remains a major challenge.

Emission of nitrogen oxides ($NO_x$) must be reduced to meet emission regulation standards. TWC catalysts typically comprise a platinum group metal supported on an oxygen storage component and/or a refractory metal oxide support, and, optionally, an additional platinum group metal component supported on a second refractory metal oxide support or a second oxygen storage component. TWC catalysts, however, are not effective for reducing $NO_x$ emissions when the gasoline engine runs lean because of excessive oxygen in the exhaust gas. Two of the most promising technologies for reducing $NO_x$ under an oxygen-rich environment are urea selective catalytic reduction (SCR) and the lean $NO_x$ trap (LNT). Urea SCR systems require a secondary fluid tank with an injection system, resulting in added system complexity. Other concerns for urea SCR include urea infrastructure, the potential freezing of urea solution, and the need for drivers to periodically fill the urea solution reservoir.

Gasoline engines, particularly lean-burn gasoline engines, offer significant potential for improving fuel efficiency and reducing $CO_2$ emissions. $NO_x$ reduction in lean-burn gasoline engines, however, presents significant challenges. One of the exhaust architectures for lean-gasoline applications is the passive $NH_3$—SCR system, which involves the use of an upstream catalyst to generate ammonia ($NH_3$) (during fuel-rich conditions) for use by a downstream $NH_3$—SCR for $NO_x$ reduction. Generation of $NH_3$ over the upstream catalyst is the most important aspect of the passive $NH_3$ approach, and increasing the conversion efficiency of engine-out $NO_x$ to $NH_3$ is the key factor for improved $NO_x$ reduction efficiency. Maximizing engine-out $NO_x$ to $NH_3$ conversion is also critical for improved fuel efficiency because $NH_3$ generation consumes fuel.

Three-way conversion (TWC) catalysts, which are free of an oxygen storage component, have been reported to be efficient $NH_3$-formation catalysts for $NH_3$—SCR applications. Such TWC catalysts, however, do not store $NO_x$ in lean operation, and, thus, the lean $NO_x$ cannot be utilized for $NH_3$ formation. Lean $NO_x$ trap (LNT) technologies store $NO_x$ in lean periods, but the oxygen storage component (OSC) that is present in LNTs consumes fuel during lean to rich transitions, which reduces $NH_3$ formation efficiency.

To meet current governmental emissions regulations, there is a need for new technologies that addresses $NO_x$ emissions and do not negatively impact $NH_3$ formation in gasoline engine applications.

SUMMARY OF THE INVENTION

A first aspect of the present invention relates to an exhaust gas treatment system. In a first embodiment, an exhaust gas treatment system comprises: an ammonia generating catalyst comprising a $NO_x$ storage component, a refractory metal oxide support, a platinum component, and a palladium component, wherein the platinum component and the palladium components are present in a platinum to palladium ratio of greater than 1 to 1, and wherein the ammonia generating catalyst is substantially free of ceria; and an ammonia selective catalytic reduction (SCR) catalyst downstream of the ammonia generating catalyst.

In a second embodiment, the system of the first embodiment is modified, wherein the $NO_x$ storage component is selected from an oxide or carbonate of an alkali or alkaline earth metal.

In a third embodiment, the system of the first and second embodiments is modified, wherein the $NO_x$ storage component is selected from an oxide or carbonate of one or more of cesium, barium, magnesium, calcium, and strontium.

In a fourth embodiment, the system of the first through third embodiments is modified, wherein the $NO_x$ storage component is selected from an oxide or carbonate of barium present in an amount in a range of 5% to 30% by weight on an oxide basis, based on the total weight of the ammonia generating catalyst.

In a fifth embodiment, the system of the first through fourth embodiments is modified, wherein the refractory metal oxide support is selected from alumina, silica, titania, zirconia and combinations thereof.

In a sixth embodiment, the system of the first through fifth embodiments is modified, wherein the Pt/Pd ratio is in the range of about 2/1 to about 100/1.

In a seventh embodiment, the system of the first through sixth embodiments is modified, wherein the Pt/Pd ratio is in the range of about 4/1 to about 20/1.

In an eighth embodiment, the system of the first through seventh embodiments is modified, wherein the ammonia generating catalyst and the SCR catalyst are on separate substrates.

In a ninth embodiment, the system of the first through eighth embodiments is modified, wherein the ammonia generating catalyst and the SCR catalyst are on a single substrate.

In a tenth embodiment, the system of the first through ninth embodiments is modified, wherein the ammonia generating catalyst comprises barium, alumina, platinum, and palladium.

In an eleventh embodiment, the system of the first through tenth embodiments is modified, wherein the SCR catalyst comprises one or more of a molecular sieve material, and a mixed oxide.

In a twelfth embodiment, the system of the eleventh embodiment is modified, wherein the molecular sieve material has a double six-ring (d6r) unit.

In a thirteenth embodiment, the system of the eleventh and twelfth embodiments is modified, wherein the molecular sieve material is selected from framework types AEI, CHA, and AFX.

In a fourteenth embodiment, the system of the eleventh through thirteenth embodiments is modified, wherein the molecular sieve material has the CHA framework type.

In a fifteenth embodiment, the system of the eleventh through fourteenth embodiments is modified, wherein the molecular sieve material has a silica to alumina ratio in the range of about 2 to about 100.

In a sixteenth embodiment, the system of the eleventh through fifteenth embodiments is modified, wherein the molecular sieve material is promoted with a metal selected from Cu, Fe, Co, Ni, La, Ce, Mn, V, Ag, and combinations thereof.

In a seventeenth embodiment, the system of the first through sixteenth embodiments is modified, wherein the SCR catalyst is disposed on a wall-flow filter.

In an eighteenth embodiment, the system of the first through sixteenth embodiments is modified, wherein the SCR catalyst is disposed on a flow-through substrate.

In a nineteenth embodiment, the system of the first through eighteenth embodiments is modified, wherein a wall flow filter is disposed upstream from the SCR catalyst, the filter having a three-way conversion catalyst and the ammonia generating catalyst thereon.

In a twentieth embodiment, the system of the ninth embodiment is modified, wherein the substrate comprises a wall-flow filter having inlet passages and outlet passages, and wherein the ammonia generating catalyst is on the inlet passages and the SCR catalyst is on the outlet passages.

In a twenty-first embodiment, the system of the first through twentieth embodiments is modified, further comprising a three-way conversion (TWC) catalyst.

In a twenty-second embodiment, the system of the twenty-first embodiment is modified, wherein the TWC catalyst is upstream of the ammonia generating catalyst.

In a twenty-third embodiment, the system of the twenty-first embodiment is modified, wherein the TWC catalyst is downstream of the ammonia generating catalyst.

In a twenty-fourth embodiment, the system of the first through twenty-third embodiments is modified, further comprising an ammonia oxidation catalyst downstream of the SCR catalyst.

In a twenty-fifth embodiment, the system of the twenty-first through twenty-fourth embodiments is modified, wherein the TWC catalyst comprises a TWC catalyst on a filter.

A second aspect of the invention is directed to an exhaust gas treatment system. In a twenty-sixth embodiment, an exhaust gas treatment system comprises: an ammonia generating catalyst that is substantially free of ceria and that comprises a $NO_x$ storage component, a refractory metal oxide support, a platinum component, and a palladium component, wherein the platinum component and the palladium components are present in a platinum to palladium ratio of greater than 2 to 1; and an ammonia selective catalytic reduction (SCR) catalyst comprising a molecular sieve material having a double six-ring (d6r) unit downstream of the ammonia generating catalyst.

A third aspect of the invention is directed to a method of treating an engine exhaust gas stream of a gasoline engine. In a twenty-seventh embodiment, a method of treating an engine exhaust gas stream of a gasoline engine comprises: flowing the engine exhaust gas stream over an ammonia generating catalyst; and directing the exhaust gas stream through a downstream SCR catalyst, wherein the ammonia generating catalyst is substantially free of ceria and comprises a $NO_x$ storage component, a refractory metal oxide support, a platinum component, and a palladium component, wherein the platinum component and the palladium components are present in a platinum to palladium ratio of greater than 1 to 1.

DETAILED DESCRIPTION OF THE INVENTION

Before describing several exemplary embodiments of the invention, it is to be understood that the invention is not limited to the details of construction or process steps set forth in the following description. The invention is capable of other embodiments and of being practiced or being carried out in various ways.

Figure 1:
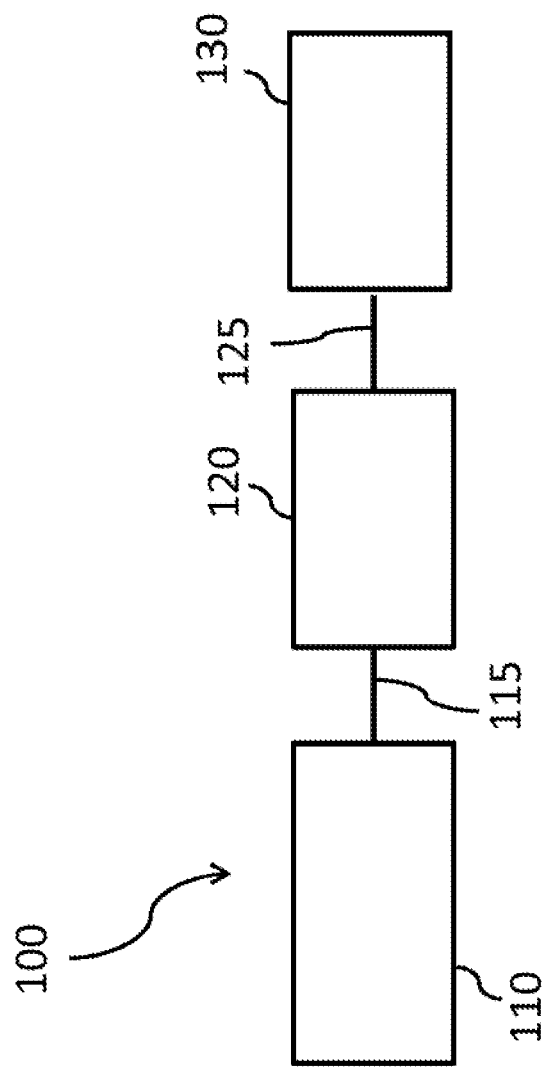
FIG. 1 is a diagram of an exhaust gas system configuration used in gasoline engines according to one or more embodiments.

FIG. 1 shows an engine exhaust system configuration used in gasoline engines according to one or more embodiments. Specifically, FIG. 1 shows an engine exhaust system 100 comprising an ammonia generating catalyst 120 downstream from a gasoline engine 110 via an exhaust conduit 115, and a SCR catalytic article 130 downstream from the ammonia generating catalyst 120 via an exhaust conduit 125. In gasoline exhaust treatment systems, as those illustrated in FIG. 1, the performance of the downstream SCR catalytic article 130 depends on the ammonia formation efficiency of the upstream ammonia generating catalyst 120. It was surprisingly found, as will be described herein, that use of an ammonia generating catalyst that is substantially free of ceria shows high conversion efficiency of $NO_x$ to $NH_3$ in rich operation, stores $NO_x$ in lean operation, and converts the stored $NO_x$ to $NH_3$.

Thus, according to various embodiments of the invention, an exhaust gas system for treatment of a gasoline engine exhaust gas stream is provided, the system comprising: an ammonia generating catalyst comprising a $NO_x$ storage component, a refractory metal oxide support, a platinum component, and a palladium component, wherein the platinum component and the palladium component are present in a platinum to palladium ratio of greater than 1 to 1, and wherein the ammonia generating catalyst is substantially free of ceria; and an ammonia selective catalytic reduction (SCR) catalyst downstream of the ammonia generating catalyst.

With respect to the terms used in this disclosure, the following definitions are provided.

As used herein, the terms "catalyst" or "catalyst material" or "catalytic material" refer to a material that promotes a reaction.

As used herein, the term "catalytic article" refers to an element that is used to promote a desired reaction. For example, a catalytic article may comprise a washcoat containing a catalytic species, e.g., a catalyst composition, on a substrate, e.g., a honeycomb substrate.

As used herein, the terms "layer" and "layered" refer to a structure that is supported on a surface, e.g. a substrate.

As used herein, the term "gasoline engine" refers to any internal combustion engine with spark-ignition designed to run on gasoline. In one or more specific embodiments, the engine is a lean gasoline direct injection engine. Gasoline direct injection (GDI) engines can have lean burn conditions and stratified combustion resulting in the generation of particulates. In contrast to particulates generated by diesel lean burn engines, the particulates generated by GDI engines tend to be finer and in lesser quantities.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the term "stream" broadly refers to any combination of flowing gas that may contain solid or liquid particulate matter. The term "gaseous stream" or "exhaust gas stream" means a stream of gaseous constituents, such as the exhaust of an engine, which may contain entrained non-gaseous components such as liquid droplets, solid particulates, and the like. The exhaust gas stream of an engine typically further comprises combustion products, products of incomplete combustion, oxides of nitrogen, combustible and/or carbonaceous particulate matter (soot), and un-reacted oxygen and nitrogen. Ammonia Generating Catalyst:

In one or more embodiments, the ammonia generating catalyst comprises a $NO_x$ storage component, a refractory metal oxide support, a platinum component, and a palladium component, wherein the platinum component and the palladium components are present in a platinum to palladium ratio of greater than 1 to 1, and wherein the ammonia generating catalyst is substantially free of ceria.

In one or more embodiments, the $NO_x$ storage (sorbent) component includes one or more alkaline earth metal oxides or carbonates, such as oxides or carbonates of Mg, Ca, Sr, and Ba, and alkali metal oxides or carbonates such as oxides or carbonates of Li, Na, K, Rb, and Cs. In one or more specific embodiments, the $NO_x$ storage component is selected from an oxide or carbonate of one or more of cesium, barium, magnesium, calcium, and strontium. For $NO_x$ storage, barium oxide is usually preferred because it forms nitrates at lean engine operation and releases the nitrates relatively easily under rich conditions. In one or more embodiments, the $NO_x$ storage component is selected from an oxide or carbonate of barium. In one or more embodiments, the $NO_x$ storage component is present in an amount in the range of about 5 to about 30 wt. %, including about 5 to about 25 wt. %, about 5 to about 20 wt. %, about 10 to about 25 wt. %, about 10 to about 20 wt. %, about 15 to about 25 wt. %, about 15 to about 20 wt. %, and about 20 to about 25 wt. %, on an oxide basis, based on the total weight of the ammonia generating catalyst.

In one or more specific embodiments, the $NO_x$ storage component comprises an oxide or carbonate of barium, and the barium is present in an amount in the range of about 5 to about 30 wt. %, including about 5 to about 25 wt. %, about 5 to about 20 wt. %, about 10 to about 25 wt. %, about 10 to about 20 wt. %, about 15 to about 25 wt. %, about 15 to about 20 wt. %, and about 20 to about 25 wt. %, on an oxide basis, based on the total weight of the ammonia generating catalyst.

As used herein, the terms "refractory metal oxide support" and "support" refer to the underlying high surface area material upon which additional chemical compounds or elements are carried. The support particles have pores larger than 20 Å and a wide pore distribution. As defined herein, such supports, e.g., metal oxide supports, exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

One or more embodiments of the present invention include a refractory metal oxide support comprising an activated compound selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, and combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the refractory metal oxide supports independently comprise a compound that is activated, stabilized, or both, selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, and combinations thereof. It is noted that when the refractory metal oxide support is stabilized with ceria, the ceria stabilizer is present in an amount less than 1 wt. %, based on the weight of the ammonia generating catalyst. In one or more embodiments, the refractory metal oxide support comprises less than 1 wt. % of a ceria stabilizer, including less than 0.75 wt. %, less than 0.5 wt. %, less than 0.25 wt. %, and less than 0.1 wt. %. In one or more specific embodiments, the refractory metal oxide support comprises alumina.

As used herein, the term "oxygen storage component" (OSC) refers to an entity that has a multi-valence state and can actively react with reductants such as carbon monoxide (CO) or hydrogen under reduction conditions and then react with oxidants such as oxygen or nitrous oxides under oxidative conditions. Examples of oxygen storage components include rare earth oxides, particularly ceria, lanthana, praseodymia, neodymia, niobia, europia, samaria, ytterbia, yttria, zirconia, and mixtures thereof in addition to ceria.

According to one or more embodiments, the ammonia generating catalyst is substantially free of ceria. As used herein, the term "substantially free of ceria" means that there is generally less than about 1 wt. %, including less than about 0.75 wt. %, less than about 0.5 wt. %, less than about 0.25 wt. %, or less than about 0.1 wt. %, of ceria in the ammonia generating catalyst. In some embodiments, no ceria has been intentionally added to the ammonia generating catalyst. It will be appreciated by one of skill in the art, however, that during loading/coating, trace amounts of ceria may migrate from one washcoat component to another, such that trace amounts of ceria can be present in the ammonia generating catalyst. In some embodiments, "substantially free of ceria" includes "free of ceria."

As used herein, the term "platinum group metal" or "PGM" refers to one or more chemical elements defined in the Periodic Table of Elements, including platinum (Pt), palladium, rhodium, osmium, iridium, and ruthenium, and mixtures thereof. In one or more embodiments, the ammonia generating catalyst comprises a platinum component and a palladium component supported on the refractory metal oxide support. Generally, there are no specific restrictions as far as the palladium and platinum content of the ammonia generating catalyst is concerned. In one or more embodiments the platinum loading is in the range of about 1 g/ft$^3$ to about 300 g/ft$^3$, including about 10 m g/ft$^3$ to about 300 g/ft$^3$, and about 10 g/ft$^3$ to about 100 g/ft$^3$, and the palladium loading is in the range of 0 g/ft$^3$ to about 150 g/ft$^3$, including about 1 g/ft$^3$ to about 100 g/ft$^3$, and 0 to about 30 g/ft$^3$.

As used herein, "platinum group metal component," "platinum component," "rhodium component," "palladium component," "iridium component" and the like refer to the respective platinum group metal compound, complex, or the like which, upon calcination or use of the catalyst decomposes or otherwise converts to a catalytically active form, usually, the metal or the metal oxide.

According to one or more embodiments, the platinum component and palladium component are present in a platinum to palladium ratio of greater than 1 to 1. In some embodiments, there is no palladium present. As will be appreciated by one skilled in the art, the platinum and/or palladium can be in an alloy form. In one or more embodiments, the Pt/Pd ratio is in the range of about 2/1 to about 100/1, including the ranges of about 2/1 to about 50/1, about 2/1 to about 25/1, about 2/1 to about 20/1, 3/1 to 100/1, 3/1 to 50/1, about 3/1 to about 25/1, about 3/1 to 20/1, 4/1 to 100/1, 4/1 to 50/1, 4/1 to 25/1, about 4/1 to about 20/1, 5/1 to about 100/1, about 5/1 to about 50/1, about 5/1 to about 25/1, about 5/1 to 20/1, about 6/1 to about 100/1, about 6/1 to about 50/1, about 6/1 to about 25/1, about 7/1 to about 100/1, about 7/1 to about 50/1, about 7/1 to about 25/1, about 8/1 to about 100/1, about 8/1 to about 50/1, about 8/1 to about 25/1, about 9/1 to about 100/1, about 9/1 to about 50/1, about 9/1 to about 25/1, about 10/1 to about 100/1, about 10/1 to about 50/1, and about 10/1 to about 25/1.

SCR Catalyst:

In one or more embodiments, the ammonia generating catalyst is upstream of a selective-catalytic reduction (SCR) catalyst. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. When a catalyst or catalyst zone is "downstream" or "upstream" from another catalyst or zone, it may be on a different substrate or brick or on a different region of the same substrate or brick.

In one or more embodiments there is one or more additional catalytic materials located between the ammonia generating catalyst and the SCR catalyst. In other embodiments, the ammonia generating catalyst is immediately upstream of the SCR catalyst. As used herein, the term "immediately upstream" refers to the relative direction according to the flow of an engine exhaust gas stream from an engine towards a tailpipe and means that there is no other catalytic material between the ammonia generating catalyst and the SCR catalyst.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" and "$NO_x$" designate the oxides of nitrogen.

The SCR catalyst can be a mixed oxide, a molecular sieve or combinations thereof. As used herein, the term "mixed oxide" refers to an oxide that contains cations of more than one chemical element or cations of a single element in several states of oxidation. In one or more embodiments, the mixed oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina, Mn/titania (e.g. $MnO_x/TiO_2$) (e.g. $MnO_x/Al_2O_3$), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. In specific embodiments, the mixed oxide comprises vanadia/titania. The vanadia/titania oxide can be activated or stabilized with tungsten (e.g., $WO_3$) to provide $V_2O_5/TiO_2/WO_3$.

As used herein, the phrase "molecular sieve" refers to framework materials such as zeolites and other framework materials (e.g., isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotypic framework materials such as SAPO, ALPO and MeAPO materials having the same framework type as the zeolite materials.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to about 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g., zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the molecular sieve materials, independently, comprise $SiO_4/AlO_4$ tetrahedra and are linked by common oxygen atoms to form a three-dimensional network. In other embodiments, the molecular sieve materials comprise $SiO_4/AlO_4/PO_4$ tetrahedra. The molecular sieve materials of one or more embodiments can be differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve materials comprise ring sizes of no larger than 12, including 6, 8, 10, and 12.

According to one or more embodiments, the molecular sieve materials can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve materials comprise an 8-ring small pore aluminosilicate zeolite. As used herein, the term "small pore" refers to pore openings, which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve materials comprise a d6r unit. Thus, in one or more embodiments, the molecular sieve materials have a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular sieve materials have a framework type selected from the group consisting of CHA, AEI, AFX, ERI, KFI, LEV, and combinations thereof. In still further specific embodiments, the molecular sieve materials have a framework type selected from CHA, AEI, and AFX. In one or more very specific embodiments, the molecular sieve materials have the CHA framework type.

Zeolitic CHA-framework type molecular sieves includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. Synthesis of a synthetic form of a molecular sieve having the CHA framework type, silicoaluminophosphate 34 (SAPO-34), is described in U.S. Pat. No. 4,440,871 and U.S. Pat. No. 7,264,789, which are hereby incorporated by reference. A method of making yet another synthetic molecular sieve having the CHA framework type, SAPO-44, is described in U.S. Pat. No. 6,162,415, which is hereby incorporated by reference.

In one or more embodiments, the molecular sieve materials can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve component can vary over a wide range. In one or more embodiments, the molecular sieve materials, have a silica to alumina molar ratio (SAR) in the range of 2 to 300, including 5 to 250; 5 to 200; 5 to 100; and 5 to 50. In one or more specific embodiments, the molecular sieve materials, have a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

As used herein, the term "promoted" refers to a component that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, suitable metal(s) is independently exchanged into the molecular sieve. According to one or more embodiments, the molecular sieve is promoted with one or more of copper (Cu), iron (Fe), cobalt (Co), nickel (Ni), lanthanum (La), cerium (Ce), manganese (Mn), vanadium (V), or silver (Ag). In specific embodiments, the molecular sieve is promoted with one or more of copper (Cu) or iron (Fe). In very specific embodiments, the molecular sieve is promoted with Cu.

The promoter metal content of the catalyst, calculated as the oxide, is, in one or more embodiments, at least about 0.1 wt. %, reported on a volatile-free basis. In specific embodiments, the promoter metal content, calculated as the oxide, is in the range of 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis.

In specific embodiments, the promoter metal comprises Cu, and the Cu content, calculated as CuO is in the range of 0.1 wt. % up to about 5 wt. %, including about 5, about 4, about 3, about 2, about 1, about 0.5, about 0.25, and about 0.1 wt. %, in each case based on the total weight of the calcined molecular sieve reported on a volatile free basis. In specific embodiments, the Cu content of the molecular sieve, calculated as CuO, is in the range of about 2 to about 5 wt. %.

In one or more embodiments, the exhaust gas treatment system further comprises an ammonia oxidation (AMOx) catalyst downstream of the SCR catalyst. The ammonia oxidation catalyst may be provided downstream of the SCR catalyst to remove any slipped ammonia from upstream components of the exhaust gas treatment system. In one or more embodiments, the SCR catalyst is on a substrate having an inlet and an outlet, and includes an ammonia oxidation (AMOx) catalyst at the outlet. In specific embodiments, the AMOx catalyst may comprise a platinum group metal such as platinum, palladium, rhodium, or combinations thereof. In one or more embodiments, the AMOx catalyst may comprise a bottom coat with one or more PGM components and a top coat with SCR functionality.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. Thus, the first catalyst can be the SCR catalyst, and the second catalyst can be an AMOx catalyst and/or SCR+AMOx integrated catalyst, optionally comprising a zeolite.

AMOx catalyst composition(s) can be coated on a flow through substrate or wall-flow filter substrate. If a wall flow filter substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow filter substrate will depend on substrate properties such as porosity and wall thickness, and typically will be lower than loading on a flow through substrate.

Substrate:

In one or more embodiments, the ammonia generating catalyst and the SCR catalyst are located on separate substrates. As used herein, the term "substrate" refers to the monolithic material onto which the catalyst material is placed, typically in the form of a washcoat. A washcoat is formed by preparing a slurry containing a specified solids content (e.g., 30-90% by weight) of catalyst in a liquid, which is then coated onto a substrate and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is selected from one or more of a flow-through honeycomb monolith, or a particulate filter, and the catalytic material(s) are applied to the substrate as a washcoat.

In one or more embodiments, the substrate is a ceramic or metal substrate having a honeycomb structure. Any suitable substrate may be employed, such as a monolithic substrate of the type having fine, parallel gas flow passages extending therethrough from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

A metallic substrate may include any metallic substrate, such as those with openings or "punch-outs" in the channel walls. A ceramic substrate may be made of any suitable refractory material, e.g., cordierite, cordierite-α-alumina, silicon nitride, zircon mullite, spodumene, alumina-silicamagnesia, zircon silicate, sillimanite, a magnesium silicate, zircon, petalite, α-alumina, an aluminosilicate and the like.

The substrates useful for the catalyst materials of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to about 25 wt. % chromium, about 1 to about 8 wt. % of aluminum, and 0 to about 20 wt. % of nickel.

In one or more embodiments in which the substrate is a particulate filter, the particulate filter can be selected from a gasoline particulate filter or a soot filter. As used herein, the terms "particulate filter" or "soot filter" refer to a filter designed to remove particulate matter from an exhaust gas stream such as soot. Particulate filters include, but are not limited to honeycomb wall flow filters, partial filtration filter, a wire mesh filter, wound fiber filters, sintered metal filters, and foam filters.

In a specific embodiment, the particulate filter is a catalyzed soot filter (CSF). The catalyzed CSF comprises a substrate coated with a washcoat layer containing a platinum group metal for burning off trapped soot and/or oxidizing NO to $NO_2$. The catalyzed CSF is coated with a platinum group metal and one or more high surface area refractory metal oxide supports (e.g., alumina, silica, silica alumina, zirconia, zirconia alumina, and ceria-zirconia) for the combustion of unburned hydrocarbons and, to some degree, particulate matter.

Wall flow substrates useful for supporting the catalyst material of one or more embodiments have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein a platinum group metal. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

Figure 2:
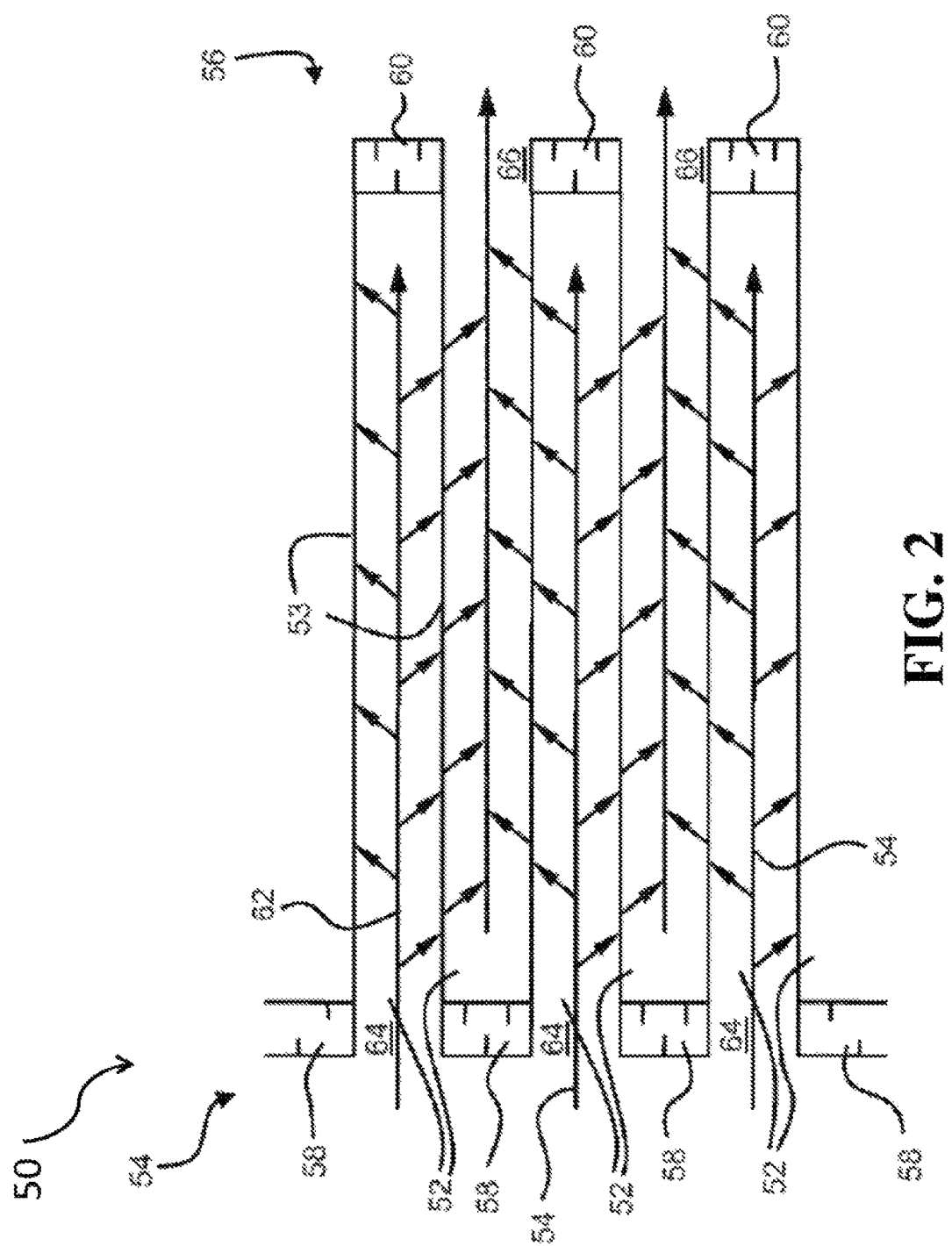
FIG. 2 shows a cross-sectional view of a section of a wall flow filter substrate.

FIG. 2 illustrates a wall flow filter substrate 50 which has a plurality of passages 52. The passages are tubularly enclosed by the channel walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet end 54 and outlet end 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

In one or more embodiments, the ammonia generating catalyst and the SCR catalyst are located on separate substrates. For example, in such embodiments, the ammonia generating catalyst can be located on a flow through substrate and the SCR catalyst can be located on a separate flow through substrate; the ammonia generating catalyst can be located on a flow through substrate; and the SCR catalyst can be located on a wall flow filter (i.e., SCR on a filter); or the ammonia generating catalyst can be located on a particulate filter and the SCR catalyst can be located on a flow through substrate. In one or more embodiments, the SCR catalyst is disposed on a wall-flow filter. In other embodiments, the SCR catalyst is disposed on a flow-through substrate.

Figure 3:
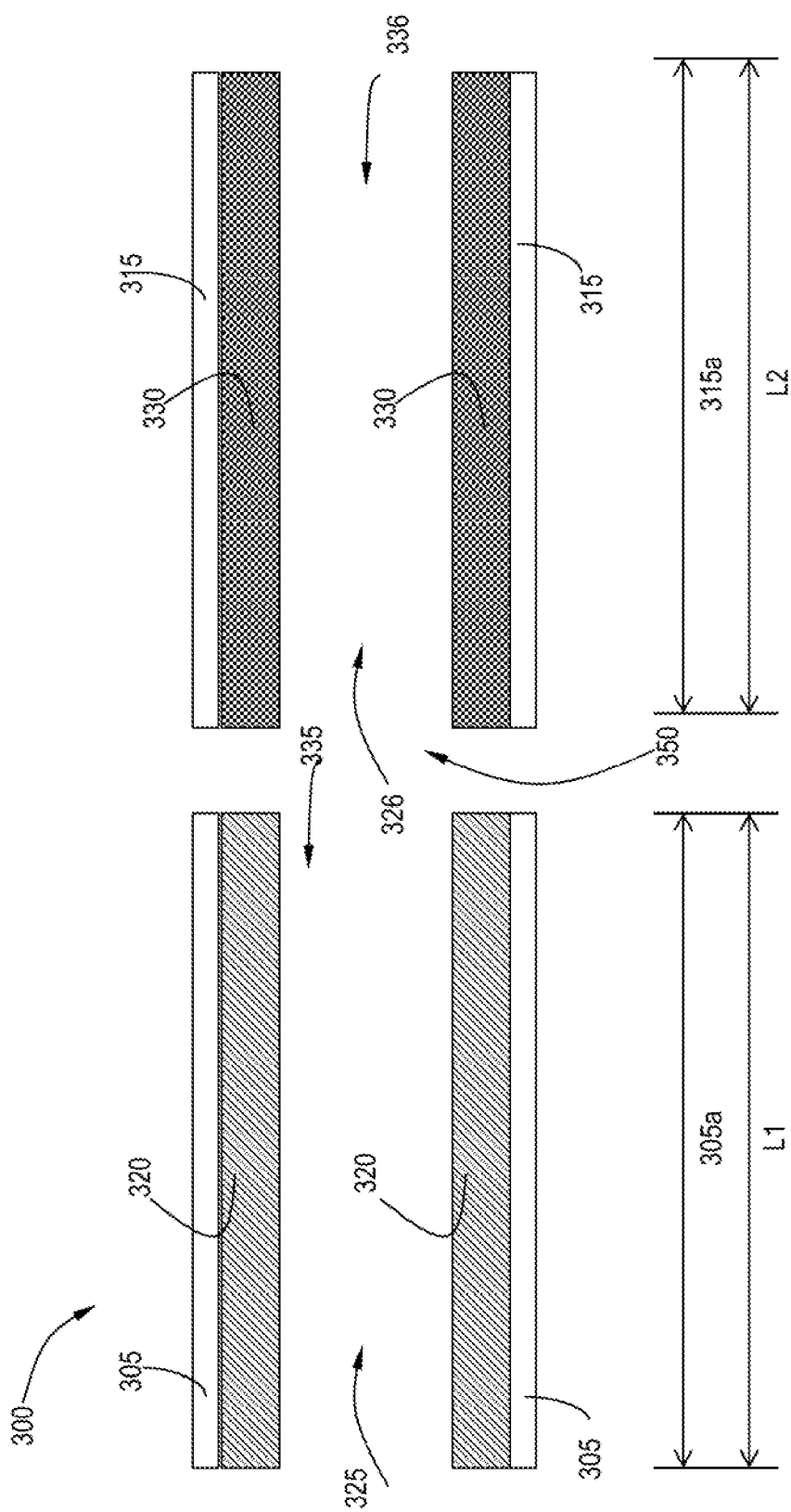
FIG. 3 shows a partial cross-sectional view of catalytic article system according to one or more embodiments.

Embodiments where the ammonia generating catalyst and the SCR catalyst are on separate substrates are more specifically illustrated in FIG. 3. Referring to FIG. 3, part of the exhaust gas treatment system 300 shown is an axially zoned arrangement where the ammonia generating catalyst 320 is located upstream of the SCR catalyst 330 and these catalysts are on separate substrates, a first substrate 305 and a second substrate 315. The ammonia generating catalyst 320 is disposed on a first substrate 305, and the SCR catalyst 330 is disposed on a separate second substrate 315. The first and second substrates 305 and 315 can be comprised of the same material or a different material. The first substrate 305 has an inlet end 325 and an outlet end 335 defining an axial length L1. The second substrate 315 has an inlet end 326 and an outlet end 336 defining an axial length L2. In one or more embodiments, the first and second substrates 305 and 315 generally comprise a plurality of channels 350 of a honeycomb substrate, of which only one channel is shown in cross-section for clarity. The ammonia generating catalyst 320 extends from the inlet end 325 of the first substrate 305 through the entire axial length L1 of the first substrate 305 to the outlet end 335. The length of the ammonia generating catalyst 320 is denoted as first zone length 305a in FIG. 3. The SCR catalyst 330 extends from the outlet end 336 of the second substrate 315 through the entire axial length L2 of the second substrate 315 to the inlet end 326. The SCR catalyst 330 defines a second zone length 315a in FIG. 3. It will be appreciated that the lengths of substrate 305a and the length of substrate 315a can be varied.

In one or more embodiments, the ammonia generating and SCR catalyst can be located on a single substrate. On a single substrate, the designs can include zoned and layered systems.

In embodiments where the ammonia generating catalyst and the SCR catalyst are on single substrate in a layered relationship, the ammonia generating catalyst can be coated on a substrate to form a first layer (or bottom coat), and the SCR catalyst is washcoated on top of the first layer to form a second layer (or top coat). It will be appreciated by one of skill in the art that the top coat/second layer of the SCR catalyst is downstream of the bottom coat/first layer of the ammonia generating catalyst.

In one or more embodiments, the ammonia generating catalyst and the SCR catalyst are arranged in an axially zoned configuration on a single substrate. As used herein, the term "axially zoned" refers to the location of the upstream zone and downstream zone relative to one another. Axially means side-by-side such that the upstream zone and the downstream zone are located one beside the other.

Figure 4:
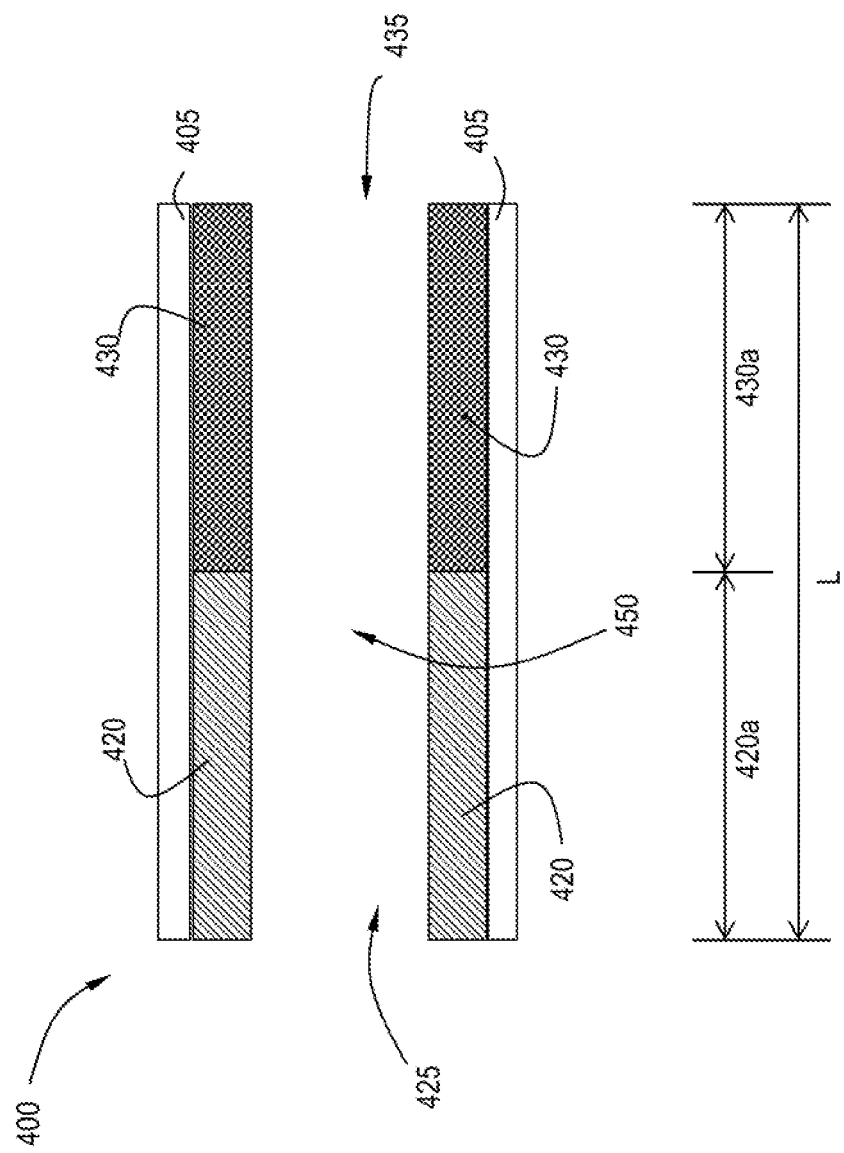
FIG. 4 shows a partial cross-sectional view of catalytic article system according to one or more embodiments.

Such embodiments may be more readily understood with reference to FIG. 4. Referring to FIG. 4, an exemplary embodiment of an axially zoned system 400 is shown. The ammonia generating catalyst 420 is located upstream of the SCR catalyst 430 on a common substrate 405. The substrate 405 has an inlet end 425 and an outlet end 435 defining an axial length L. In one or more embodiments, the substrate 405 generally comprises a plurality of channels 450 of a honeycomb substrate, of which only one channel is shown in cross-section for clarity. The ammonia generating catalyst 420 extends from the inlet end 425 of the substrate 405 through less than the entire axial length L of the substrate 405. The length of the ammonia generating catalyst 420 is denoted as first zone length 420a in FIG. 4. The SCR catalyst 430 extends from the outlet end 435 of the substrate 405 through less than the entire axial length L of the substrate 405. The length of the SCR catalyst 430 is denoted as the second zone length 430a in FIG. 4.

In one or more embodiments, as illustrated in FIG. 4, the ammonia generating catalyst 420 is directly abutting the SCR catalyst 430. In still further embodiments, there may be a gap between the ammonia generating catalyst 420 and the SCR catalyst 430 (not illustrated). It will be appreciated by one skilled in the art that the ammonia generating catalyst 420 and SCR catalyst 430 can be at least partially overlapping (not illustrated). In one or more embodiments the ammonia generating catalyst 420 is at least partially overlapping the SCR catalyst 430. In other embodiments, the SCR catalyst 430 is at least partially overlapping the ammonia generating catalyst 420.

In one or more embodiments, the ammonia generating catalyst and the SCR catalyst are on a single substrate, which comprises a wall flow filter. In one or more embodiments, the ammonia generating catalyst is coated on the inlet passages of the wall flow filter, and the SCR catalyst is coated on the outlet passages of the wall flow filter.

Figure 5:
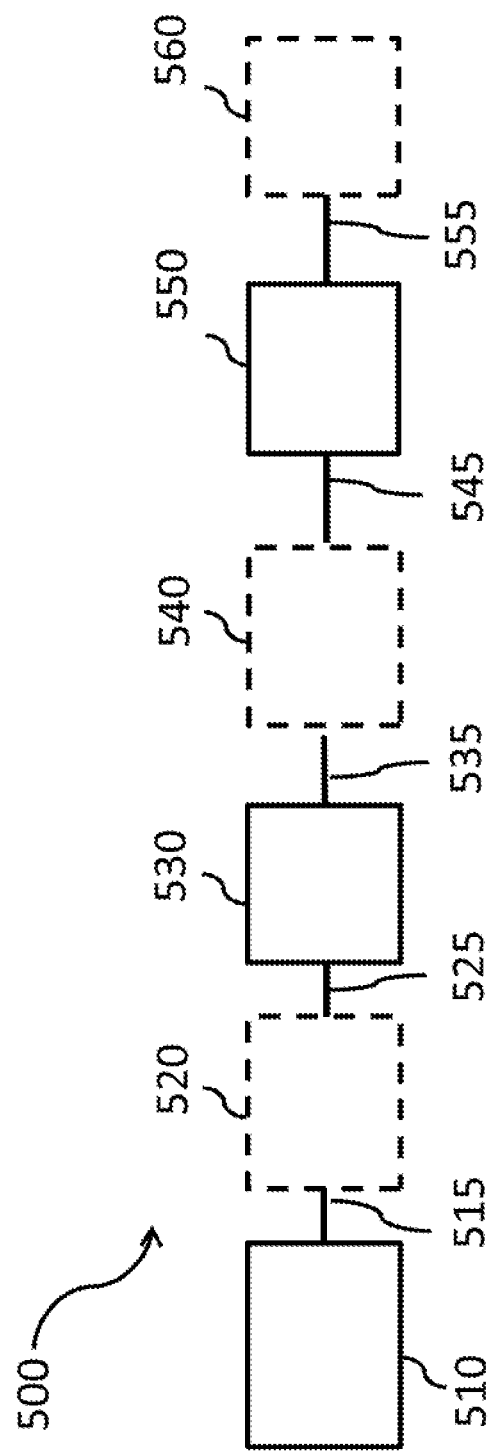
FIG. 5 is a diagram of an exemplary exhaust gas system configuration used in gasoline engines according to one or more embodiments of the invention.

Referring to FIG. 5, the engine exhaust system of one or more embodiments can further comprise a three-way conversion (TWC) catalyst upstream or downstream from the ammonia generating catalyst. Additionally, in one or more embodiments, the engine exhaust system can further comprises an ammonia oxidation catalyst disposed downstream of the SCR catalyst to address any slipped ammonia. Specifically, FIG. 5 shows an engine exhaust system 500 comprising an ammonia generating catalyst 530 downstream from a gasoline engine 510 via an exhaust conduit 515, an optional TWC catalyst 540 downstream from the ammonia generating catalyst 530 via an exhaust conduit 535, and a SCR catalytic article 550 downstream from the ammonia generating catalyst 530 and the optional TWC catalyst 540 via an exhaust conduit 545. In one or more embodiments, the exhaust gas system 500 further comprises an optional ammonia oxidation catalyst 560 disposed downstream of the SCR catalyst 550 via an exhaust conduit 555.

Referring to FIG. 5, in other embodiments, the gasoline engine exhaust system 500 comprises an ammonia generating catalyst 530 downstream from a gasoline engine 510 via an exhaust conduit 515, an optional TWC catalyst 520 upstream from the ammonia generating catalyst 530 via an exhaust conduit 525, and a SCR catalytic article 550 downstream from the ammonia generating catalyst 530 and the optional TWC catalyst 520 via an exhaust conduit 545. In one or more embodiments, the exhaust gas system 500 further comprises an optional ammonia oxidation catalyst 560 disposed downstream of the SCR catalyst 550 via an exhaust conduit 555.

It will be appreciated by one skilled in the art that one or more of the ammonia generating catalyst 530, the SCR catalyst 550, or either of the optional TWC catalysts 520 and 540 can be on a filter.

Figure 6:
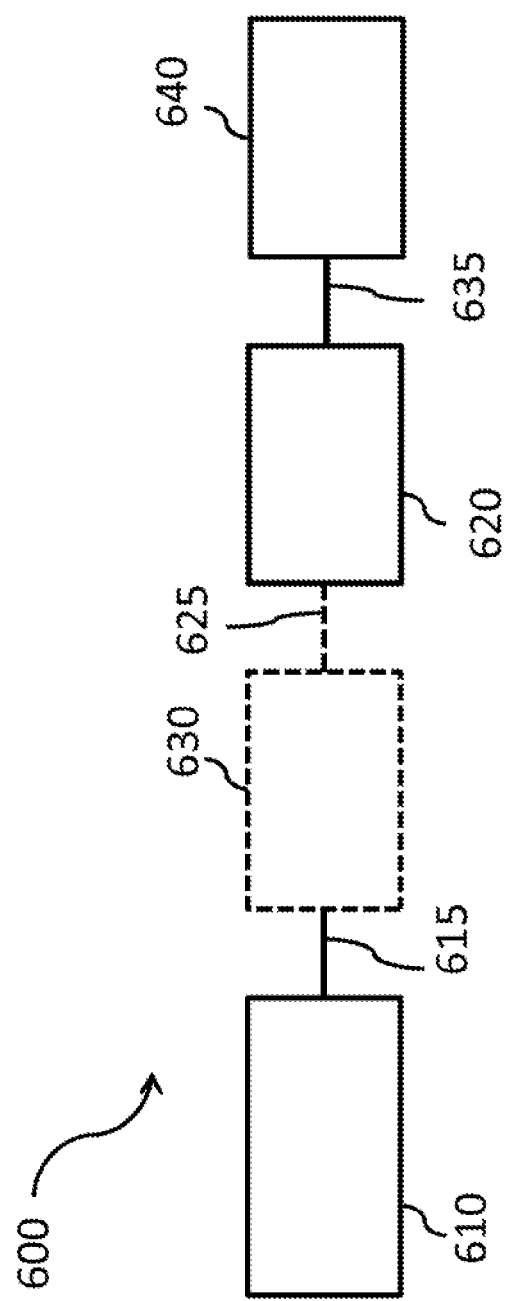
FIG. 6 is a diagram of an exemplary exhaust gas system configuration used in gasoline engines according to one or more embodiments of the invention.

Referring to FIG. 6, the engine exhaust gas treatment system of one or more embodiments can further comprises a wall flow filter disposed upstream of the SCR catalyst. Specifically, FIG. 6 shows an engine exhaust system 600 comprising an ammonia generating catalyst 620 downstream from a gasoline engine 610 via an exhaust conduit 615, an optional wall flow filter 630 upstream from the ammonia generating catalyst 620 via an optional exhaust conduit 625, and a SCR catalytic article 640 downstream from the ammonia generating catalyst 620 via an exhaust conduit 635. In one or more embodiments, the wall flow filter 630 has a three-way conversion (TWC) catalyst disposed thereon. In other embodiments, the wall flow filter 630 has a TWC catalyst disposed thereon, as well as the ammonia generating catalyst disposed thereon. In such embodiments, the optional exhaust conduit 625 is absent from the engine exhaust system 600.

Without limitation, Table 1 presents various system configurations of one or more embodiments. It is noted that each component is connected to the next component via exhaust conduits such that the engine is upstream of component A, which is upstream of component B, which is upstream of component C, which is upstream of component D.

TABLE 1

System Configurations

| Component A | Component B | Component C | Component D |
|---|---|---|---|
| Ammonia generating catalyst | TWC | SCR | Optional AMOx |
| Ammonia generating catalyst | TWC | SCR on a filter | Optional AMOx |
| Ammonia generating catalyst on a filter | TWC | SCR | Optional AMOx |
| TWC | Ammonia generating catalyst | SCR | Optional AMOx |
| TWC | Ammonia generating catalyst on a filter | SCR | Optional AMOx |
| TWC | Ammonia generating catalyst | SCR on a filter | Optional AMOx |
| TWC | Ammonia generating catalyst | SCR | Optional AMOx |
| Ammonia generating catalyst | TWC on a filter | SCR | Optional AMOx |

Method of Treating Engine Exhaust:

Another aspect of the present invention is directed to a method of treating the exhaust gas stream of an engine. In one or more embodiments, a method for treatment of an engine exhaust gas stream of a gasoline engine comprises flowing the engine exhaust gas stream over an ammonia generating catalyst; and directing the exhaust gas stream containing ammonia through a SCR catalyst.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of $Pt/Al_2O_3$, $Pd/Al_2O_3$ and $Pt,Pd/Al_2O_3$ Powder Samples Pt, in the form of platinum amine solution, and Pd, in the form of palladium nitrate, according to the quantities listed in Table 2, were impregnated onto γ-Al$_2$O$_3$ by conventional incipient wetness techniques. The samples were dried at 120° C. for 8 hours, followed by calcination at 550° C. for 4 hours.

TABLE 2

Pt, Pd Powder Compositions

| | Sample ID | | | | | |
|---|---|---|---|---|---|---|
| | 1A | 1B | 1C | 1D | 1E | 1F |
| Pt % | 8.90 | 8.08 | 7.12 | 4.45 | 1.78 | 0 |
| Pd % | 0 | 0.826 | 1.78 | 4.45 | 7.12 | 8.90 |

Example 2—H$_2$ Temperature Programmed Reduction (TPR) Measurement

Reducibility of the Example 1 samples were measured by H$_2$ TPR. Prior to measurement, samples were treated at 450° C. in 4% O$_2$/He for 20 min, and then cooled down to −50° C. in He (g). TPR was measured in the presence of 1% H$_2$/N$_2$ with temperature ramping up from −50 to 700° C. at a rate of 10° C./min. The volumes of H$_2$ consumed to reduce per gram of each sample were plotted in FIGS. 7A and 7B Each samples were measured after degreening at 750° C. for 2.5 hours (FIG. 7A) and also after aging at 950° C. for 40 hours (FIG. 7B), in 2% O$_2$ and 10% H$_2$O balanced with N$_2$.

Figure 7A:
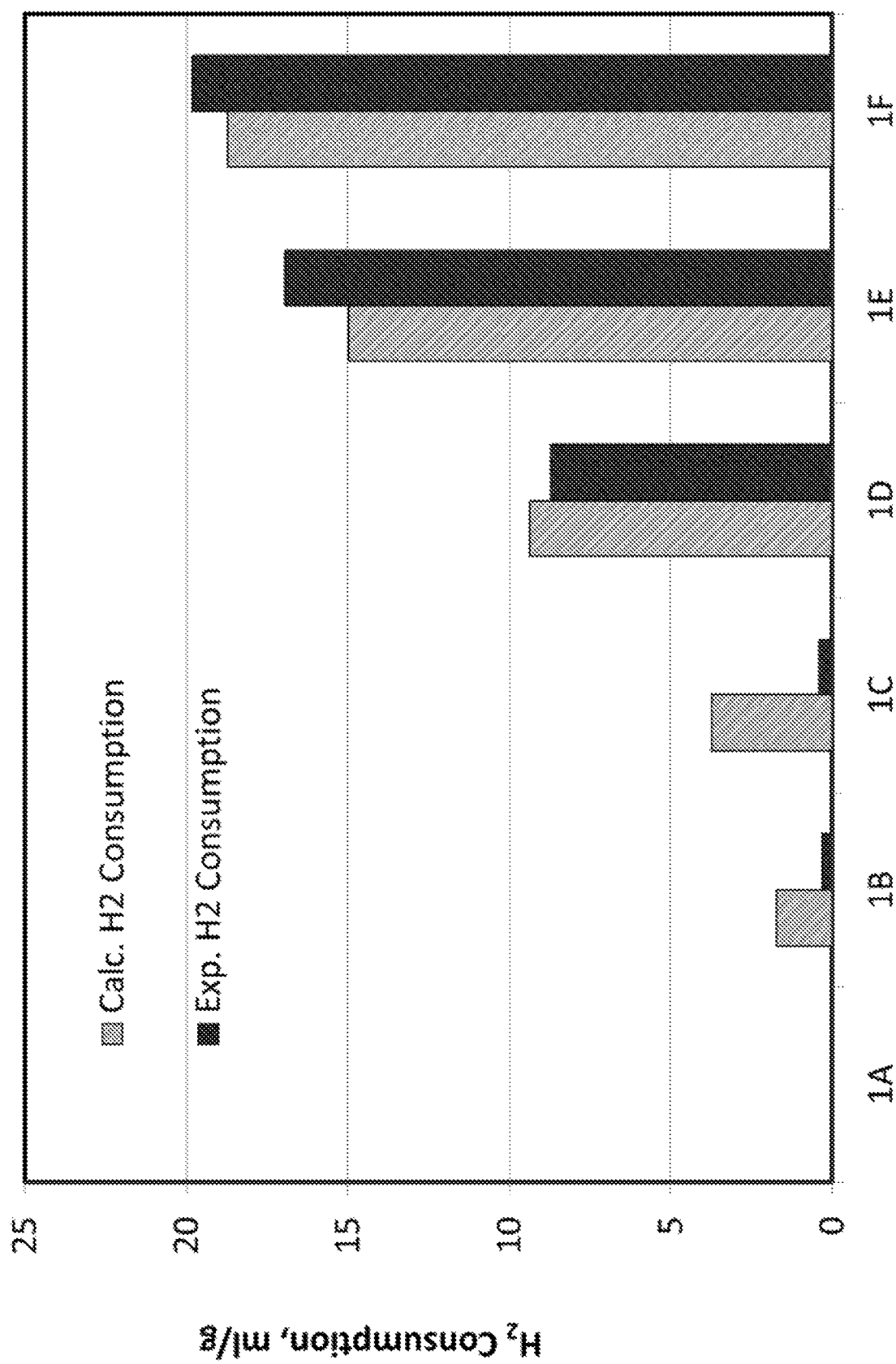
FIGS. 7A and 7B are bar charts showing the volumes of $H_2$ consumed per gram for samples prepared according to the Examples.
Figure 7B:
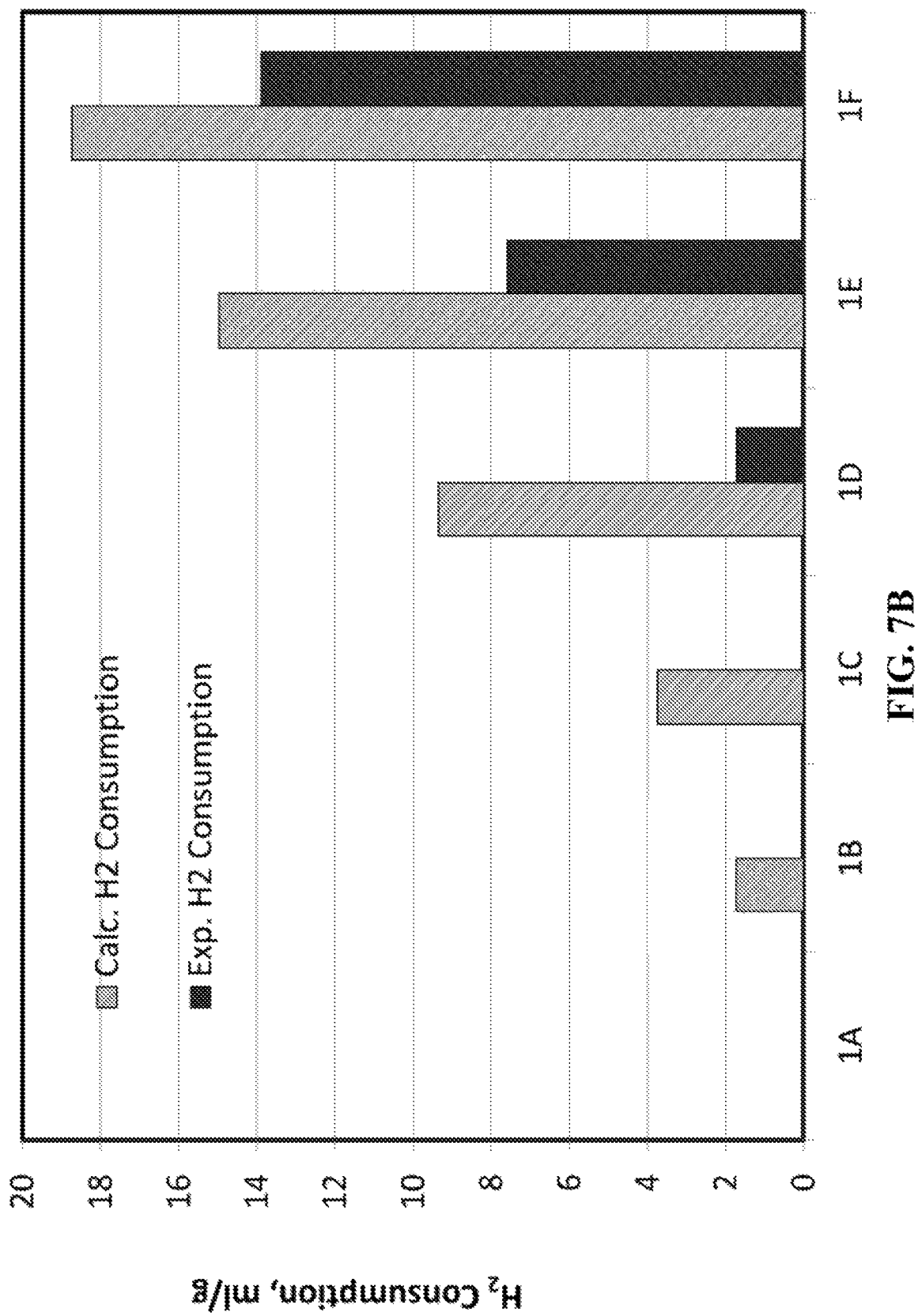

H$_2$-TPR study on Example 1 samples at various Pt/Pd ratios demonstrates that Pt/Al$_2$O$_3$ and Pt/Pd/Al$_2$O$_3$ samples which are rich in Pt (Pt/Pd ratio at 10/1 and 4/1) consume minimal quantity of H$_2$ (FIGS. 7A and 7B). On the other hand, Pd/Al$_2$O$_3$ and Pt/Pd/Al$_2$O$_3$ rich in Pd (Pt/Pd ratio at 1/1 and 1/4) consume high quantity of H$_2$. Volumes of H$_2$ consumed by the degreened Pd/Al$_2$O$_3$, Pt/Pd/Al$_2$O$_3$ at 1/1 and 1/4 are similar to the calculated H$_2$ consumption volumes based on the assumption that all PdO is reduced to Pd. Volumes of H$_2$ consumed by the aged Pd/Al$_2$O$_3$ and Pt/Pd/Al$_2$O$_3$ at 1/4 are lower than the calculated values, but they are significantly higher than those of the Pt/Pd/Al$_2$O$_3$ rich in Pt, and the H$_2$ consumption linearly increases with Pd loading increasing. The H$_2$-TPR study suggests that Pt/Al$_2$O$_3$ and Pt/Pd/Al$_2$O$_3$ at ratios of 4/1 and above will have much shorter delay in NH$_3$ formation than Pd/Al$_2$O$_3$ and Pt/Pd/Al$_2$O$_3$ at ratio of 1/1 and below during lean to rich transition.

Example 3—Preparation of Catalyst

The catalyst contains an activated γ-alumina, barium carbonate, platinum, and palladium at concentrations of approximately 68%, 23%, 8%, and 0.8%, respectively, based on the calcined weight of the catalyst. Pd in the form of palladium nitrate and Pt in the form of platinum amine solution were introduced onto the BaCO$_3$/γ-Al$_2$O$_3$ by conventional incipient wetness techniques. This catalyst was coated onto a flow-through monolith substrate carrier having a cell density of 900 cells per square inch (cpsi) and a 2.5 mil wall thickness. The total washcoat loading after 550° C. calcination for one hour in air was about 1.8 g/in$^3$.

Example 4—Preparation of a Comparative Catalyst

This two layer formulation, which comprises an undercoat washcoat layer and a top washcoat layer, was coated onto a flow-through monolith substrate carrier having a cell density of 400 cells per square inch (cpsi) and a 4 mil wall thickness, the top washcoat layer being coated over the undercoat washcoat layer. The catalyst has a total 180 g/ft$^3$ PGM nominal loading with a Pt/Pd ratio of 63/117.

The first layer (undercoat washcoat layer) contains an activated γ-alumina, cerium oxide, barium carbonate, magnesia, zirconia, platinum, and palladium at concentrations of approximately 55%, 23%, 10%, 7.1%, 3.5%, 1.1% and 0.12%, respectively, based on the calcined weight of the catalyst. The total washcoat loading of the first layer after 550° C. calcination for one hour in air was about 3.4 g/in$^3$.

The second layer (top washcoat layer) was disposed on the first layer. The second layer contains an activated γ-alumina, OSC material (CeO$_2$/ZrO$_2$) with promoters, barium carbonate, zirconia, palladium at concentrations of approximately 9.2%, 78%, 8.7%, 2.3%, 3%, respectively, based on the calcined weight of the catalyst. The second trap layer was coated over the entire first layer. The total washcoat of the second layer after 550° C. calcination was about 2.2 g/in$^3$.

Example 5—Lean-Rich Cycle Test to Demonstrate Lean NO$_x$ Storage and Conversion of the Stored NO$_x$ to NH$_3$ NO$_x$ storage and NH$_3$ formation activity of Example 3 and Example 4 were evaluated after degreening the catalysts at 750° C. for 2.5 hours and after aging at 950° C. for 40 hours. The catalysts were evaluated on a reactor test rig with FTIR analytical apparatus. The evaluations were conducted with cycles of a 60 seconds lean gas exposure followed by a 60 seconds rich gas exposure. The feeding gases contained hydrocarbons, CO, CO$_2$, H$_2$O and N$_2$. NO was only included in the lean gas feed. The rich gas lambda is 0.953. The temperature was 355° C. in lean operation and 450° C. in rich operation.

Figure 8A:
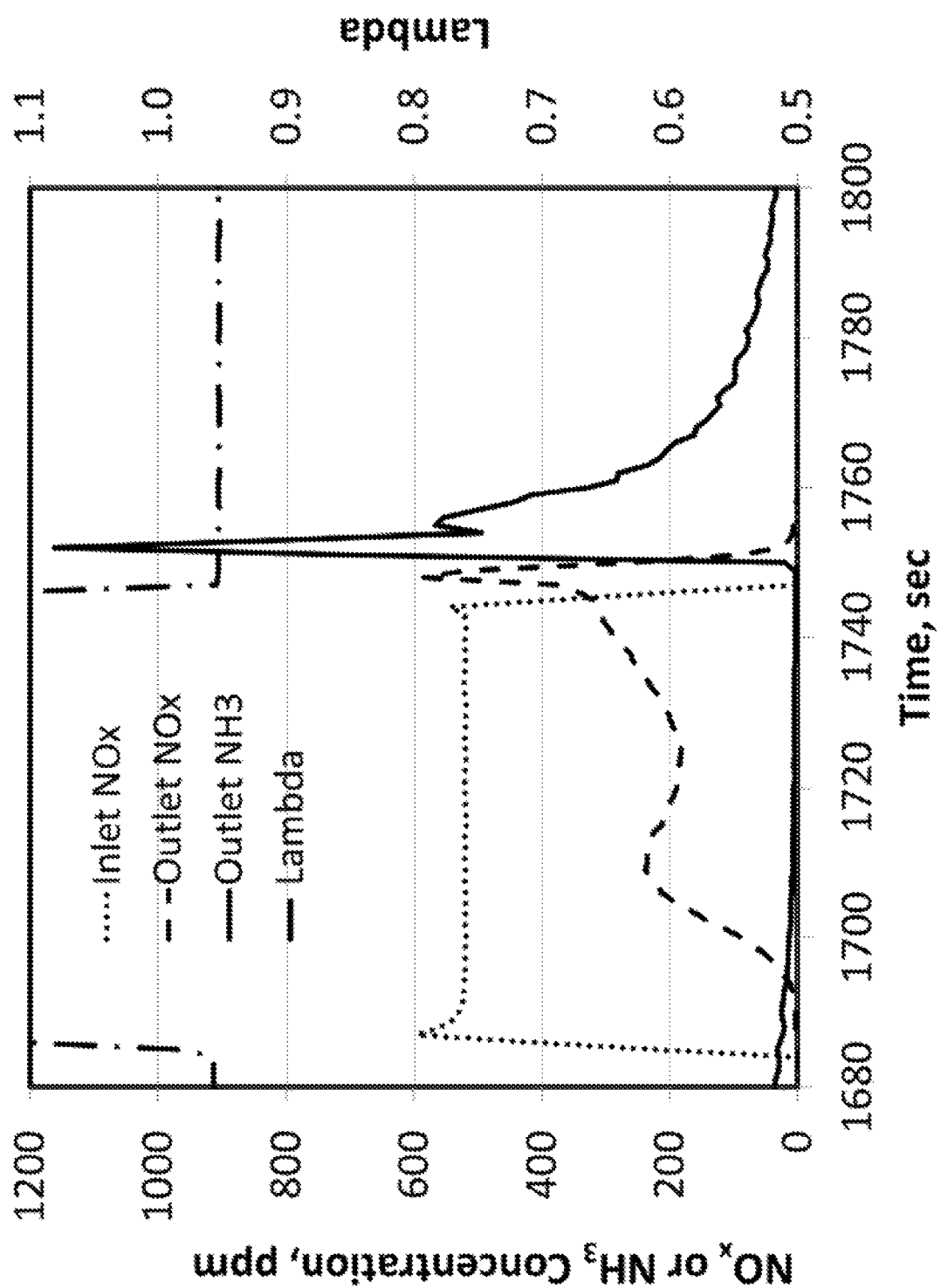
FIGS. 8A and 8B are graphs showing the $NO_x$ and $NH_3$ concentrations for samples prepared according to the Examples.
Figure 8B:
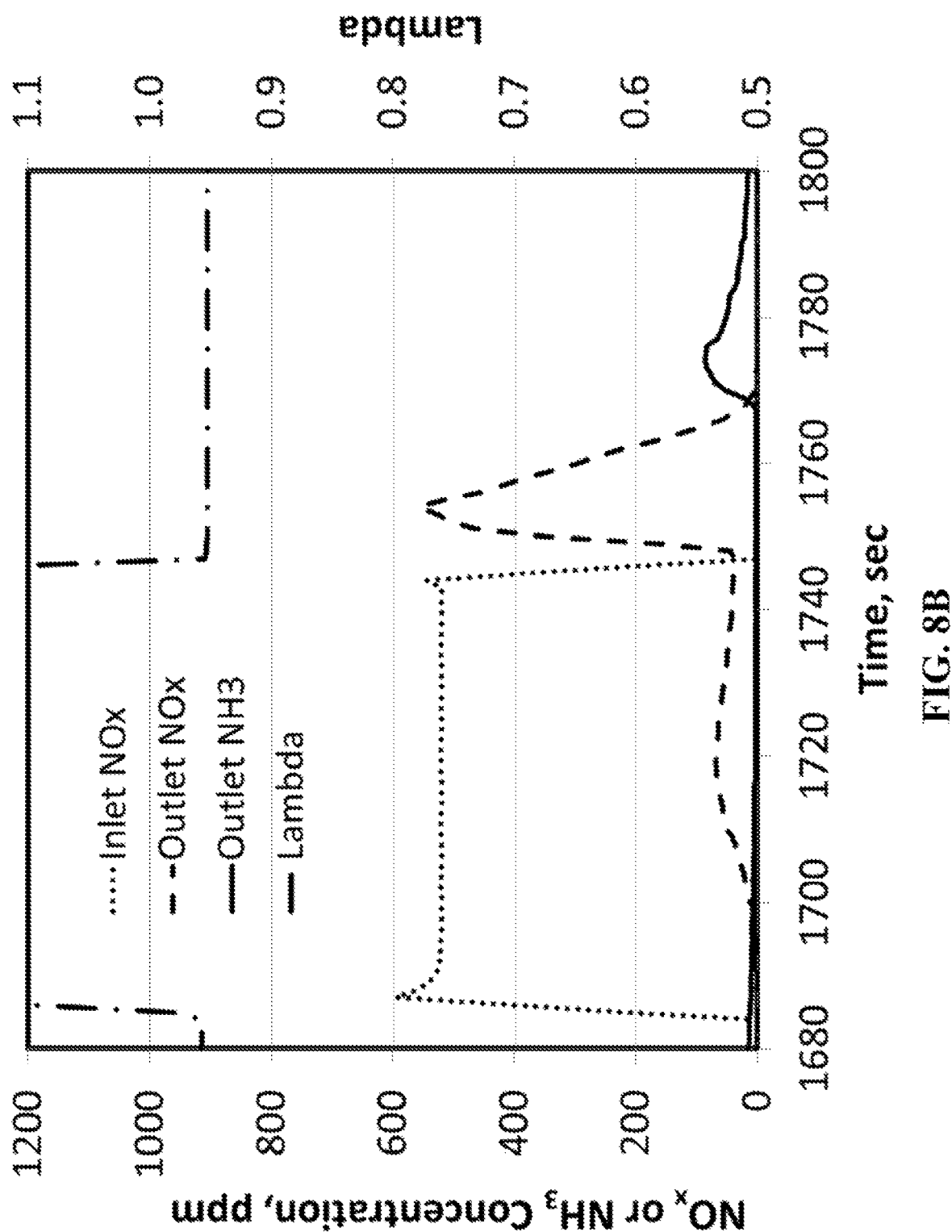

FIGS. 8A and 8B present the NO$_x$ and NH$_3$ concentrations of Example 3 and Example 4 tested after 950° C. aging. Example 3 showed NO$_x$ storage in lean exposure, as evidenced by the decreased outlet NO$_x$ concentration relative to the inlet NO$_x$ concentration. After transition to rich gas, a sharp NH$_3$ peak up to 1150 ppm was observed. Because NO$_x$ was not fed in the rich gas, the formed NH$_3$ originated from the stored lean NO$_x$. Example 4 showed even higher NO$_x$ storage than Example 3 in lean exposure. However, after transition to rich, only a very small amount of NH$_3$ formed (less than 100 ppm), and the NH$_3$ formation showed a significant delay.

Example 6—Lean-Rich Cycle Test to Demonstrate Conversion of the Stored NO$_x$ and the Rich NO$_x$ to NH$_3$ To demonstrate the NH$_3$ formation activity from both lean NO$_x$ and rich NO$_x$, Example 3 and Example 4 were evaluated in the same condition as Example 5, except NO was also included in the rich gas feed.

Figure 9A:
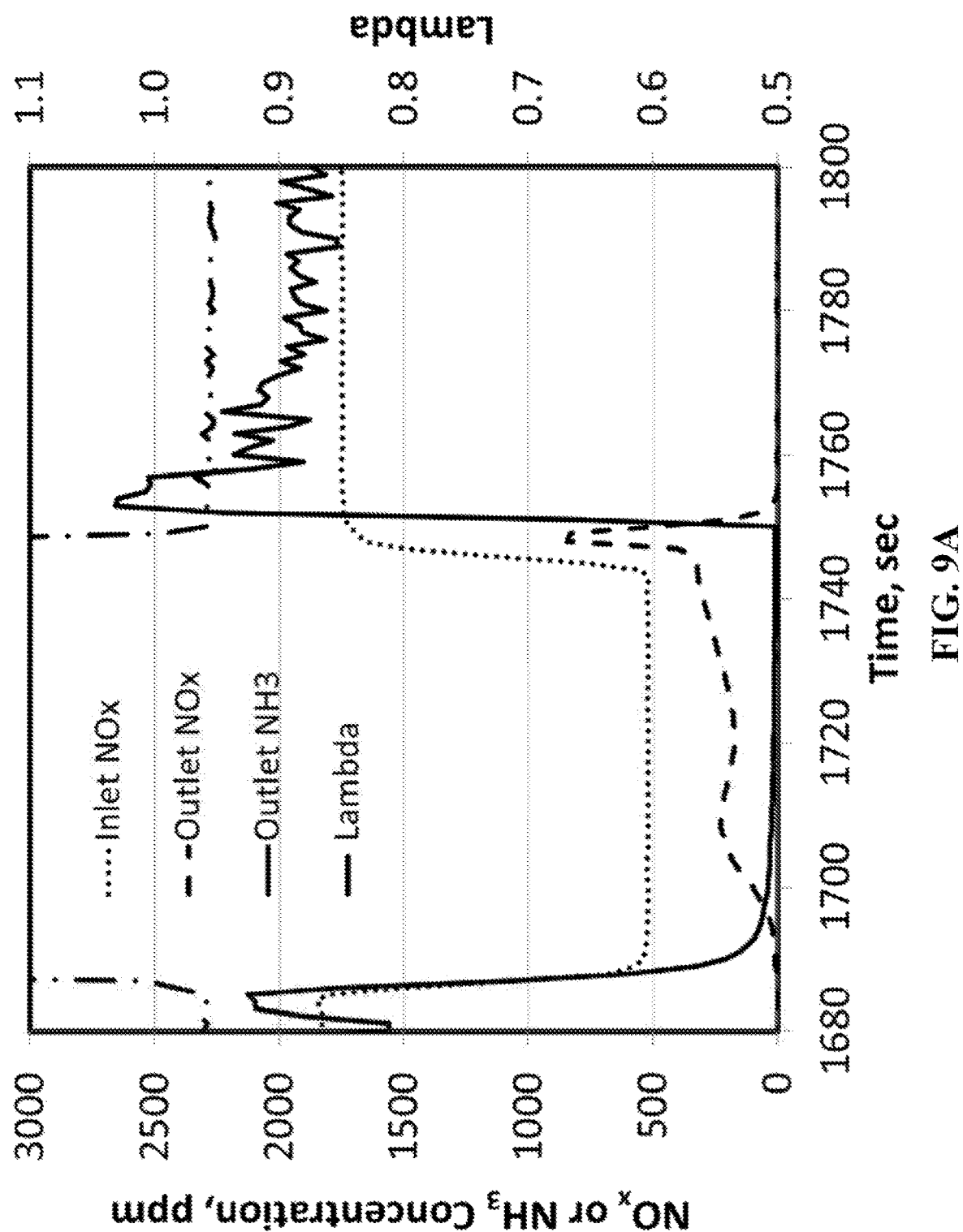
FIGS. 9A and 9B are graphs showing the $NO_x$ and $NH_3$ concentrations for samples prepared according to the Examples.
Figure 9B:
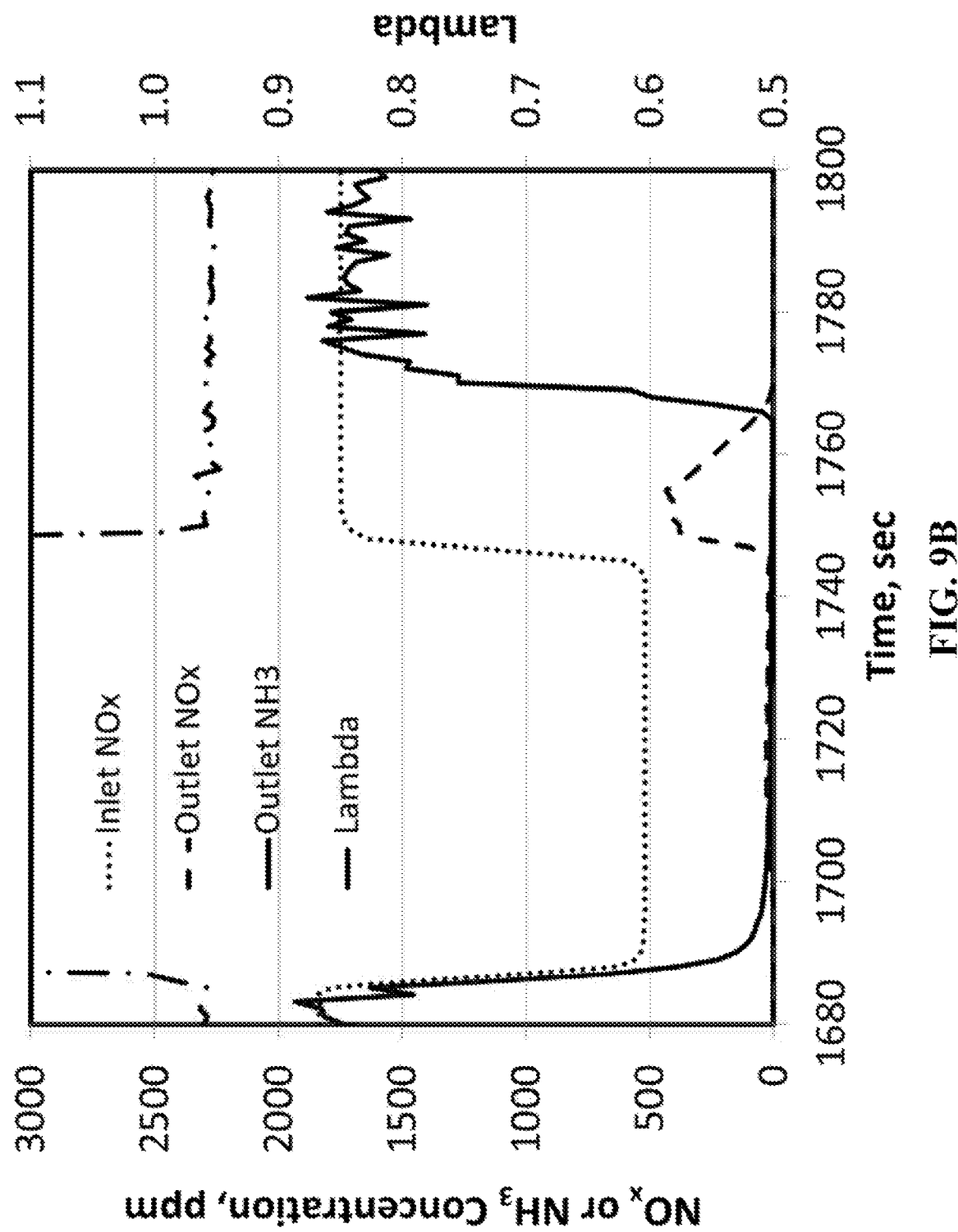

FIGS. 9A and 9B present the NO$_x$ and NH$_3$ concentrations of Example 3 and Example 4 tested after 950° C. aging. In the case of Example 3, NH$_3$ concentrations are far above the rich feed NO$_x$, indicating the catalyst efficiently converted the stored lean NO$_x$ and the rich NO$_x$ to NH$_3$. NH$_3$ formation appeared soon after the lean to rich transition only with a short delay, because the catalyst did not contain OSC and the Pt/Pd ratio was 245/25. In the case of Example 4, the NH$_3$ concentrations were below the rich feed NO$_x$ concentration.

NH₃ formation appeared much latter after lean to rich transition, due to the reductant consumption by OSC and PdO.

Example 7—Preparation of Catalysts with Different BaO Loading

Various catalysts were prepared, comprising alumina, barium carbonate, platinum, and palladium at concentrations listed in Table 3, based on the calcined weight of the catalyst. Pd in the form of palladium nitrate and Pt in the form of platinum amine solution were introduced onto $BaCO_3/\gamma$-$Al_2O_3$ by conventional incipient wetness techniques. This catalyst was coated onto a flow-through monolith substrate carrier having a cell density of 900 cells per square inch (cpsi) and a 2.5 mil wall thickness. The total washcoat loading after 550° C. calcination for one hour in air was about 1.7 $g/in^3$.

TABLE 3

Catalyst Compositions with Different BaO Loadings

| Sample ID | $BaCO_3$ wt. % | alumina wt. % | Pt wt. % | Pd wt. % |
|---|---|---|---|---|
| 7A | 12.1 | 83.4 | 4.1 | 0.4 |
| 7B | 24.3 | 71.2 | 4.1 | 0.4 |
| 7C | 32.2 | 63.3 | 4.1 | 0.4 |
| 7D | 38.6 | 56.9 | 4.1 | 0.4 |

Figure 10A:
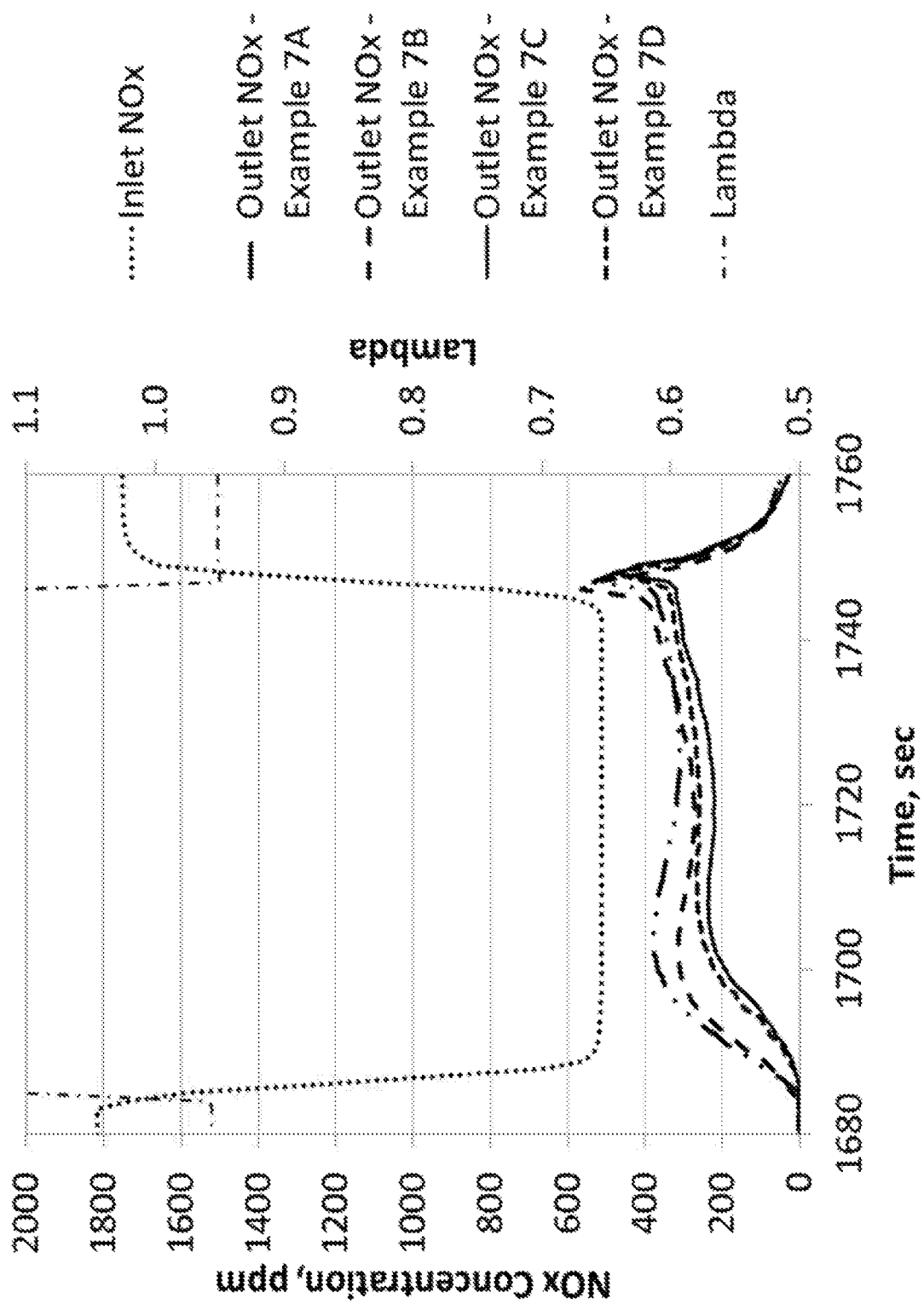
FIGS. 10A and 10B are graphs showing $NO_x$ concentrations for samples prepared according to the Examples.
Figure 10B:
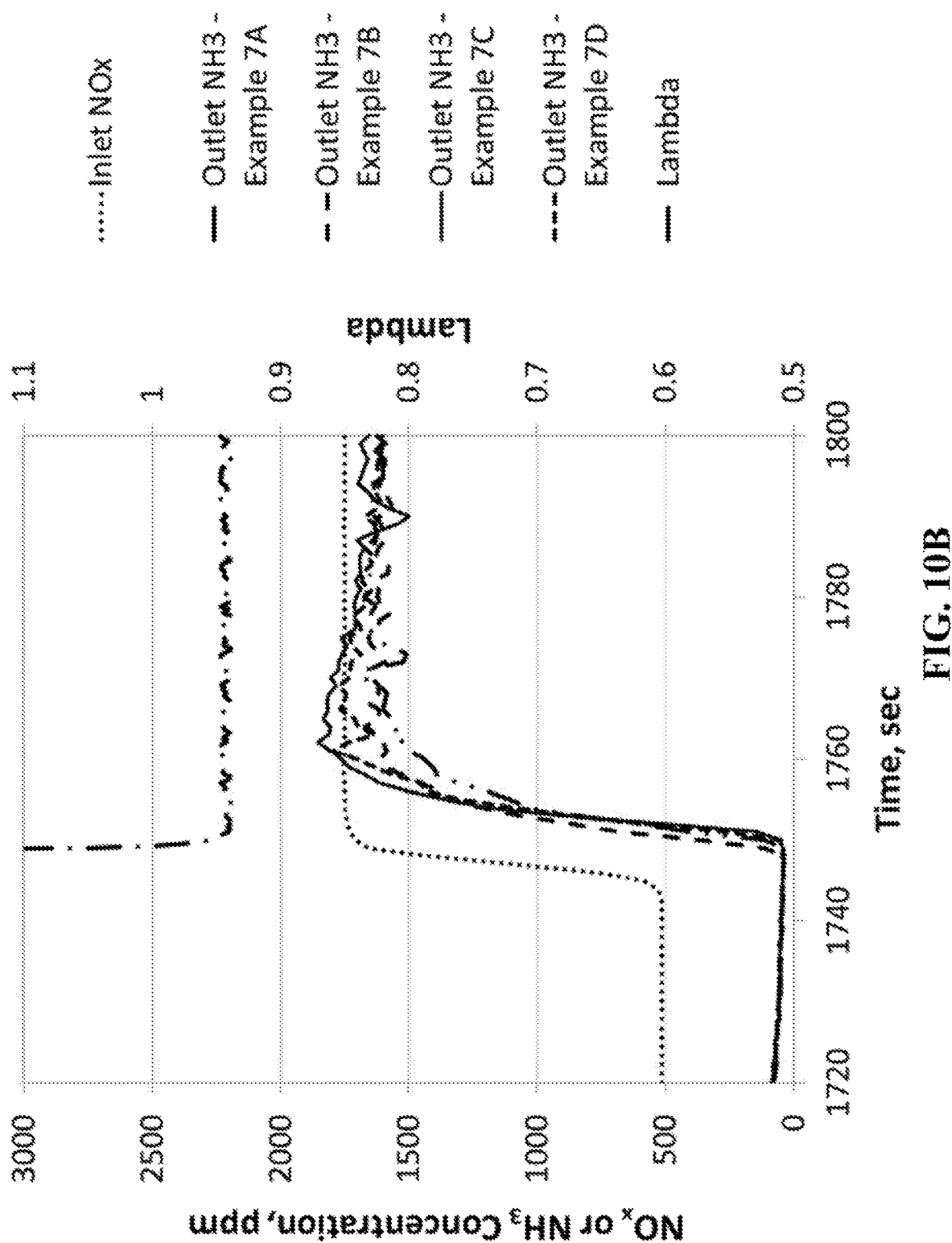

The catalysts with Sample IDs 7A, 7B, 7C and 7D were tested in the same condition as described in EXAMPLE 6, to demonstrate the BaO loading effect on $NO_x$ storage capacity and NH₃ formation activity. FIGS. 10A and 10B present the $NO_x$ concentrations in lean operation and the NH₃ concentrations in rich operation of Example 7A to 7D tested after aging at 950° C. for 40 hours. FIG. 10A shows the outlet $NO_x$ concentrations decrease with increased BaO loading from 10 to 25%, indicating that higher BaO loading provided higher $NO_x$ storage capacity. Further increasing the BaO loading to 30% did not show benefit. FIG. 10B shows the NH₃ concentrations increase with increased BaO loading from 10 to 25%, indicating that the higher $NO_x$ storage capacity resulted from higher BaO loading increased NH₃ formation. Further increasing the BaO loading to 30% did not show benefit.

Comparative Example 8—Preparation of Catalyst Containing Ceria

The catalyst contains ceria, alumina, barium carbonate, platinum, and palladium at concentrations listed in Table 4, based on the calcined weight of the catalyst. Pd in the form of palladium nitrate and Pt in the form of platinum amine solution were introduced onto the $BaCO_3/\gamma$-$Al_2O_3$ by conventional incipient wetness techniques. This catalyst was coated onto a flow-through monolith substrate carrier having a cell density of 900 cells per square inch (cpsi) and a 2.5 mil wall thickness. The total washcoat loading after 550° C. calcination for one hour in air was included in Table 4.

TABLE 4

Catalyst Compositions with Different Ceria Loadings

| Sample ID | $CeO_2$ wt. % | $BaCO_3$ wt. % | alumina wt. % | Pt wt. % | Pd wt. % | Washcoat Loading $g/in^3$ |
|---|---|---|---|---|---|---|
| 8A | 1 | 24 | 70.4 | 4.1 | 0.4 | 1.7 |
| 8B | 5 | 23 | 67.6 | 3.9 | 0.4 | 1.8 |
| 8C | 10 | 21.8 | 64.2 | 3.7 | 0.4 | 1.9 |

Figure 11:
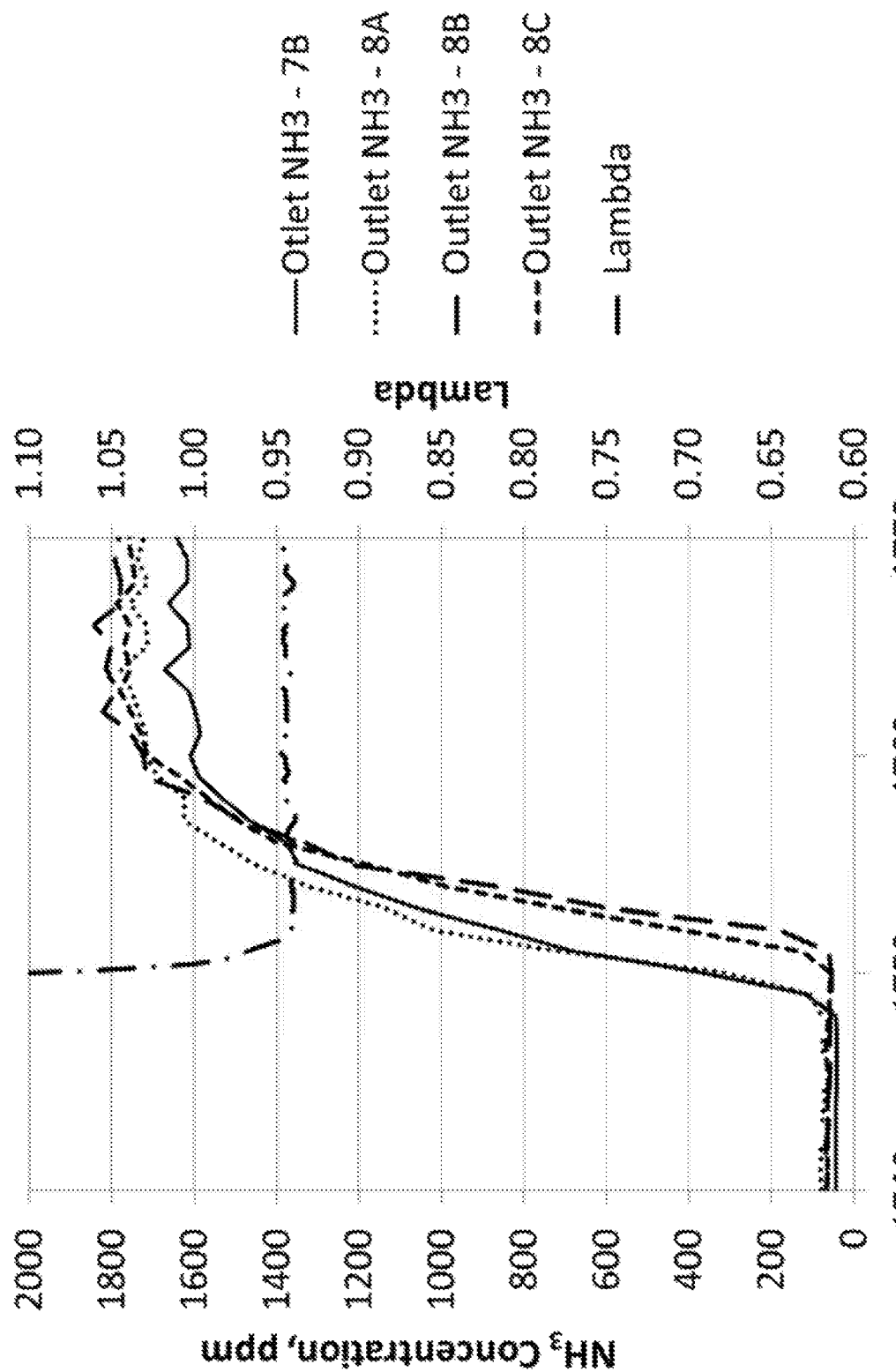
FIG. 11 is a graph showing the $NH_3$ concentrations for samples prepared according to the Examples.

The catalysts with Sample IDs 7B, 8A, 8B and 8C were tested in the same condition as described in EXAMPLE 6, to demonstrate the negative impact of ceria on NH₃ formation activity. FIG. 11 presents the outlet NH₃ concentrations of these catalysts, tested after aging at 950° C. for 40 hours. Sample ID 8A, which contains 1% of ceria, did not delay the NH₃ formation, as compared to Sample ID 7B which is substantially free of ceria. Sample IDs 8B and 8C, containing 5 and 10% ceria, respectively, delayed NH₃ formation during the transition from lean to rich operation.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An exhaust gas treatment system comprising:
an ammonia generating catalyst comprising a $NO_x$ storage component, a refractory metal oxide support, a platinum component, and a palladium component, wherein the platinum component and the palladium components are present in a platinum to palladium ratio of greater than 6 to 1, and wherein the ammonia generating catalyst is substantially free of ceria;
wherein the $NO_x$ storage component is present in an amount of about 15 to about 25 wt. % on an oxide basis, based on total weight of the ammonia generating catalyst;
and wherein the ammonia generating catalyst is disposed on a flow-through monolith substrate carrier; and
an ammonia selective catalytic reduction (SCR) catalyst downstream of the ammonia generating catalyst.

2. The exhaust gas treatment system of claim 1, wherein the $NO_x$ storage component is selected from an oxide or carbonate of an alkali or alkaline earth metal.

3. The exhaust gas treatment system of claim 2, wherein the $NO_x$ storage component is selected from an oxide or carbonate of one or more of cesium, barium, magnesium, calcium, and strontium.

4. The exhaust gas treatment system of claim 3, wherein the $NO_x$ storage component is selected from an oxide or carbonate of barium.

5. The exhaust gas treatment system of claim 1, wherein the refractory metal oxide support is selected from alumina, silica, titania, zirconia and combinations thereof.

6. The exhaust gas treatment system of claim 1, wherein the Pt/Pd ratio is in the range of 6/1 to 100/1.

7. The exhaust gas treatment system of claim 6, wherein the Pt/Pd ratio is in the range of 6/1 to 20/1.

8. The exhaust gas treatment system of claim 1, wherein the ammonia generating catalyst and the SCR catalyst are on separate substrates.

9. The exhaust gas treatment system of claim 1, wherein the ammonia generating catalyst and the SCR catalyst are on a single substrate.

10. The exhaust gas treatment system of claim 9, wherein the substrate comprises a wall-flow filter having inlet passages and outlet passages, and wherein the ammonia generating catalyst is on the inlet passages and the SCR catalyst is on the outlet passages.

11. The exhaust gas treatment system of claim 1, wherein the ammonia generating catalyst comprises barium, alumina, platinum, and palladium.

12. The exhaust gas treatment system of claim 1, wherein the SCR catalyst comprises one or more of a molecular sieve material, and a mixed oxide.

13. The exhaust gas treatment system of claim 12, wherein the molecular sieve material has a double six-ring (d6r) unit.

14. The exhaust gas treatment system of claim 13, wherein the molecular sieve material is selected from framework types AEI, CHA, and AFX.

15. The exhaust gas treatment system of claim 14, wherein the molecular sieve material has the CHA framework type.

16. The exhaust gas treatment system of claim 12, wherein the molecular sieve material has a silica to alumina ratio in the range of 2 and 100.

17. The exhaust gas treatment system of claim 12, wherein the molecular sieve material is promoted with a metal selected from Cu, Fe, Co, Ni, La, Ce, Mn, V, Ag, and combinations thereof.

18. The exhaust gas treatment system of claim 1, wherein the SCR catalyst is disposed on a wall-flow filter.

19. The exhaust gas treatment system of claim 1, wherein the SCR catalyst is disposed on a flow-through substrate.

20. The exhaust gas treatment system of claim 1, wherein a wall flow filter is disposed upstream from the SCR catalyst, the filter having a three-way conversion (TWC) catalyst and the ammonia generating catalyst thereon.

21. The exhaust gas treatment system of claim 1, further comprising a three-way conversion (TWC) catalyst.

22. The exhaust gas treatment system of claim 21, wherein the TWC catalyst is upstream of the ammonia generating catalyst.

23. The exhaust gas treatment system of claim 22, wherein the TWC catalyst comprises a TWC catalyst on a filter.

24. The exhaust gas treatment system of claim 21, wherein the TWC catalyst is downstream of the ammonia generating catalyst.

25. The exhaust gas treatment system of claim 1, further comprising an ammonia oxidation catalyst downstream of the SCR catalyst.

26. An exhaust gas treatment system comprising:
   an ammonia generating catalyst that is substantially free of ceria and that comprises a $NO_x$ storage component, a refractory metal oxide support, a platinum component, and a palladium component, wherein the platinum component and the palladium components are present in a platinum to palladium ratio of greater than 6 to 1; and wherein the $NO_x$ storage component is present in an amount of about 15 to about 25 wt. % on an oxide basis, based on total weight of the ammonia generating catalyst; and
   an ammonia selective catalytic reduction (SCR) catalyst comprising a molecular sieve material having a double six-ring (d6r) unit downstream of the ammonia generating catalyst.

27. A method of treating an engine exhaust gas stream of a gasoline engine, the method comprising flowing the engine exhaust gas stream over an ammonia generating catalyst; and directing the exhaust gas stream through a downstream SCR catalyst, wherein the ammonia generating catalyst is substantially free of ceria and comprises a $NO_x$ storage component, a refractory metal oxide support, a platinum component, and a palladium component, wherein the platinum component and the palladium component are present in a platinum to palladium ratio of greater than 6 to 1; and wherein the $NO_x$ storage component is present in an amount of about 15 to about 25 wt. % on an oxide basis, based on total weight of the ammonia generating catalyst.

* * * * *